US009033792B2

(12) United States Patent
Rodgers et al.

(10) Patent No.: US 9,033,792 B2
(45) Date of Patent: May 19, 2015

(54) GAMING SYSTEM, GAMING DEVICE AND GAMING METHOD PROVIDING ADDITIONAL AWARD OPPORTUNITIES FOR AN ACTIVATION OF A SYMBOL GENERATOR BASED ON AN OCCURRENCE OF A TRIGGERING EVENT

(71) Applicant: IGT, Reno, NV (US)

(72) Inventors: Paulina Rodgers, Reno, NV (US); Christmas C. Parker, Reno, NV (US); Benjamin C. Hoffman, Reno, NV (US); Benjamin M. Fuller, Sparks, NV (US)

(73) Assignee: IGT, Las Vegas, NV (US)

( * ) Notice: Subject to any disclaimer, the term of this patent is extended or adjusted under 35 U.S.C. 154(b) by 163 days.

(21) Appl. No.: 13/711,263

(22) Filed: Dec. 11, 2012

(65) Prior Publication Data

US 2013/0102378 A1 Apr. 25, 2013

Related U.S. Application Data

(63) Continuation of application No. 12/569,178, filed on Sep. 29, 2009, now Pat. No. 8,353,762, which is a continuation-in-part of application No. 12/270,079, filed on Nov. 13, 2008, now Pat. No. 8,262,458.

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.
CPC ............ *G07F 17/34* (2013.01); *G07F 17/3258* (2013.01); *G07F 17/3225* (2013.01)

(58) Field of Classification Search
CPC ............ G07F 17/3227; G07F 17/3244; G07F 17/3267
USPC ......................................... 463/25–27, 20, 21
See application file for complete search history.

(56) References Cited

U.S. PATENT DOCUMENTS

| | | |
|---|---|---|
| 4,890,845 A | 1/1990 | Gatewood |
| 5,046,738 A | 9/1991 | Coates |
| 5,188,363 A | 2/1993 | Marnell, II et al. |
| 5,612,574 A | 3/1997 | Cole et al. |
| 5,766,076 A | 6/1998 | Pease et al. |

(Continued)

FOREIGN PATENT DOCUMENTS

| | | |
|---|---|---|
| AU | 199650720 | 10/1996 |
| EP | 1 533 763 | 5/2005 |

OTHER PUBLICATIONS

Beat the Slots [online] [retrieved on Feb. 27, 2009]. Retrieved from the Internet at <URL: http://beattheslots.blogspot.com/2008/03/wheel-of-fortune-slot-machine.html>. (5 pages).

(Continued)

*Primary Examiner* — Omkar Deodhar
*Assistant Examiner* — Allen Chan
(74) *Attorney, Agent, or Firm* — Neal, Gerber & Eisenberg LLP

(57) ABSTRACT

A gaming system, gaming device, and gaming method including a symbol generator, where a number of awards available to the player in a single activation of the symbol generator and/or which awards are available to a player in a single activation of the symbol generator are based on an occurrence of one or more triggering events.

42 Claims, 33 Drawing Sheets

(56) References Cited

U.S. PATENT DOCUMENTS

| | | | |
|---|---|---|---|
| 5,788,573 | A | 8/1998 | Baerlocher et al. |
| 5,823,874 | A | 10/1998 | Adams |
| 5,827,119 | A | 10/1998 | Bromley |
| 5,848,932 | A | 12/1998 | Adams |
| 5,855,515 | A | 1/1999 | Pease et al. |
| 5,885,158 | A | 3/1999 | Torango et al. |
| 5,911,418 | A | 6/1999 | Adams |
| 6,162,121 | A | 12/2000 | Morro et al. |
| 6,168,520 | B1 | 1/2001 | Baerlocher et al. |
| 6,224,483 | B1 | 5/2001 | Mayeroff |
| 6,358,149 | B1 | 3/2002 | Schneider et al. |
| 6,413,161 | B1 | 7/2002 | Baerlocher et al. |
| 6,491,296 | B2 | 12/2002 | Kelly et al. |
| 6,533,273 | B2 | 3/2003 | Cole et al. |
| 6,561,512 | B2 | 5/2003 | Luciano et al. |
| 6,565,433 | B1 | 5/2003 | Baerlocher et al. |
| 6,582,307 | B2 | 6/2003 | Webb |
| 6,599,193 | B2 | 7/2003 | Baerlocher et al. |
| 6,605,000 | B2 | 8/2003 | Adams |
| 6,612,574 | B1 | 9/2003 | Cole et al. |
| 6,612,575 | B1 | 9/2003 | Cole et al. |
| 6,659,864 | B2 | 12/2003 | McGahn et al. |
| 6,663,448 | B1 | 12/2003 | Davies et al. |
| 6,663,489 | B2 | 12/2003 | Baerlocher |
| 6,712,694 | B1 | 3/2004 | Nordman |
| 6,793,577 | B1 | 9/2004 | Wilkins et al. |
| 6,796,902 | B2 | 9/2004 | Baerlocher et al. |
| 6,827,646 | B2 | 12/2004 | Adams |
| D503,951 | S | 4/2005 | Karstens |
| 6,890,255 | B2 | 5/2005 | Jarvis et al. |
| D512,464 | S | 12/2005 | Karstens |
| D512,465 | S | 12/2005 | Karstens |
| 6,981,635 | B1 | 1/2006 | Hughs-Baird et al. |
| 7,001,278 | B2 | 2/2006 | Maya et al. |
| 7,004,835 | B2 | 2/2006 | Baerlocher |
| 7,011,581 | B2 | 3/2006 | Cole et al. |
| 7,021,624 | B2 | 4/2006 | Luciano et al. |
| 7,066,814 | B2 | 6/2006 | Glavich et al. |
| 7,144,321 | B2 | 12/2006 | Mayeroff |
| 7,169,045 | B2 | 1/2007 | Nordman |
| 7,172,506 | B2 | 2/2007 | Baerlocher et al. |
| 7,179,169 | B2 | 2/2007 | Beaulieu et al. |
| 7,198,570 | B2 | 4/2007 | Rodgers et al. |
| 7,204,754 | B2 | 4/2007 | Gray et al. |
| 7,210,997 | B2 | 5/2007 | Hughs-Bair et al. |
| 7,226,357 | B2 | 6/2007 | Vancura |
| 7,226,358 | B2 | 6/2007 | Miller et al. |
| 7,241,220 | B2 | 7/2007 | Rothkranz et al. |
| 7,258,609 | B2 | 8/2007 | Nordman et al. |
| 7,258,610 | B2 | 8/2007 | Seelig et al. |
| 7,300,350 | B2 | 11/2007 | Seelig et al. |
| 7,306,520 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,326,109 | B2 | 2/2008 | Baerlocher |
| 7,329,180 | B2 | 2/2008 | Gatewood |
| 7,354,342 | B2 | 4/2008 | Paulsen et al. |
| 7,357,716 | B2 | 4/2008 | Marks et al. |
| 7,371,174 | B2 | 5/2008 | Baerlocher |
| 7,377,849 | B2 | 5/2008 | Baerlocher et al. |
| 7,390,261 | B2 | 6/2008 | Nordman |
| 7,399,226 | B2 | 7/2008 | Mishra |
| 7,425,117 | B2 | 9/2008 | Robinson et al. |
| 7,427,236 | B2 | 9/2008 | Kaminkow et al. |
| 7,431,649 | B2 | 10/2008 | Webb et al. |
| 7,442,123 | B2 | 10/2008 | Brill et al. |
| 7,448,949 | B2 | 11/2008 | Kaminkow et al. |
| 7,488,250 | B2 | 2/2009 | Baerlocher et al. |
| 7,533,885 | B2 | 5/2009 | Nicely et al. |
| 7,666,089 | B2 | 2/2010 | Rodgers et al. |
| 7,674,172 | B2 | 3/2010 | Miltenberger et al. |
| 7,874,913 | B2 | 1/2011 | Webb et al. |
| 7,942,737 | B2 | 5/2011 | Cregan et al. |
| 2003/0069066 | A1 | 4/2003 | Seelig et al. |
| 2003/0216166 | A1 | 11/2003 | Baerlocher et al. |
| 2003/0236116 | A1 | 12/2003 | Marks et al. |
| 2004/0048644 | A1 | 3/2004 | Gerrard et al. |
| 2004/0053660 | A1* | 3/2004 | Webb et al. .................... 463/16 |
| 2004/0053665 | A1 | 3/2004 | Baerlocher |
| 2004/0082373 | A1 | 4/2004 | Cole et al. |
| 2004/0082378 | A1 | 4/2004 | Peterson et al. |
| 2004/0147305 | A1 | 7/2004 | Seelig et al. |
| 2004/0171417 | A1 | 9/2004 | Beaulieu et al. |
| 2004/0180711 | A1 | 9/2004 | Seelig et al. |
| 2004/0209671 | A1 | 10/2004 | Okada |
| 2005/0026671 | A1 | 2/2005 | Baerlocher |
| 2005/0032568 | A1 | 2/2005 | Griswold et al. |
| 2005/0054424 | A1 | 3/2005 | Rothkranz et al. |
| 2005/0054435 | A1 | 3/2005 | Rodgers et al. |
| 2005/0075159 | A1 | 4/2005 | Kaminkow et al. |
| 2005/0075161 | A1 | 4/2005 | McGlone et al. |
| 2005/0148383 | A1 | 7/2005 | Mayeroff |
| 2005/0212210 | A1 | 9/2005 | Ogiwara |
| 2005/0215307 | A1 | 9/2005 | Jarvis et al. |
| 2006/0025195 | A1 | 2/2006 | Pennington et al. |
| 2006/0025196 | A1 | 2/2006 | Webb et al. |
| 2006/0030403 | A1 | 2/2006 | Lafky et al. |
| 2006/0035706 | A1 | 2/2006 | Thomas et al. |
| 2006/0040721 | A1 | 2/2006 | Cuddy et al. |
| 2006/0068875 | A1 | 3/2006 | Cregan et al. |
| 2006/0068883 | A1 | 3/2006 | Randall et al. |
| 2006/0073872 | A1 | 4/2006 | B-Jensen et al. |
| 2006/0073877 | A1 | 4/2006 | Rodgers et al. |
| 2006/0084493 | A1 | 4/2006 | Pederson et al. |
| 2006/0183535 | A1 | 8/2006 | Marks et al. |
| 2006/0237905 | A1 | 10/2006 | Nicely |
| 2006/0246989 | A1 | 11/2006 | Glavich et al. |
| 2007/0054733 | A1 | 3/2007 | Baerlocher |
| 2007/0060266 | A1 | 3/2007 | Kojima |
| 2007/0060271 | A1 | 3/2007 | Cregan et al. |
| 2007/0060314 | A1 | 3/2007 | Baerlocher et al. |
| 2007/0060321 | A1 | 3/2007 | Vasquez et al. |
| 2007/0072668 | A1 | 3/2007 | Hein et al. |
| 2007/0087811 | A1 | 4/2007 | Mayeroff |
| 2007/0120320 | A1 | 5/2007 | Miltenberger et al. |
| 2007/0135203 | A1 | 6/2007 | Nicely |
| 2007/0135204 | A1 | 6/2007 | Nicely |
| 2007/0149292 | A1 | 6/2007 | Kaminkow et al. |
| 2007/0155481 | A1 | 7/2007 | Vancura |
| 2007/0167211 | A1 | 7/2007 | Rodgers et al. |
| 2007/0184887 | A1 | 8/2007 | Cannon |
| 2007/0191088 | A1 | 8/2007 | Breckner et al. |
| 2007/0218975 | A1 | 9/2007 | Iddings et al. |
| 2007/0218982 | A1 | 9/2007 | Baerlocher |
| 2007/0298874 | A1 | 12/2007 | Baerlocher et al. |
| 2007/0298875 | A1 | 12/2007 | Baerlocher et al. |
| 2008/0020817 | A1 | 1/2008 | Kaminkow et al. |
| 2008/0020832 | A1 | 1/2008 | Iddings et al. |
| 2008/0020833 | A1 | 1/2008 | Baerlocher et al. |
| 2008/0020834 | A1 | 1/2008 | Breckner et al. |
| 2008/0020846 | A1 | 1/2008 | Vasquez et al. |
| 2008/0039191 | A1 | 2/2008 | Cuddy |
| 2008/0051168 | A1 | 2/2008 | Kaminkow et al. |
| 2008/0070702 | A1 | 3/2008 | Kaminkow et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0076552 | A1 | 3/2008 | Baerlocher et al. |
| 2008/0090643 | A1 | 4/2008 | Kaminkow et al. |
| 2008/0090647 | A1 | 4/2008 | Kaminkow et al. |
| 2008/0090651 | A1 | 4/2008 | Baerlocher |
| 2008/0096648 | A1 | 4/2008 | Webb et al. |
| 2008/0102927 | A1 | 5/2008 | Mayeroff |
| 2008/0108410 | A1 | 5/2008 | Baerlocher |
| 2008/0108423 | A1 | 5/2008 | Benbrahim et al. |
| 2008/0108430 | A1 | 5/2008 | Evans |
| 2008/0108431 | A1 | 5/2008 | Cuddy et al. |
| 2008/0113760 | A1 | 5/2008 | Baerlocher |
| 2008/0113779 | A1 | 5/2008 | Cregan |
| 2008/0146309 | A1 | 6/2008 | Bennett |
| 2008/0146319 | A1 | 6/2008 | Yoshizawa |
| 2008/0148542 | A1 | 6/2008 | Mayeroff |
| 2008/0182638 | A1 | 7/2008 | Paulsen et al. |
| 2008/0207298 | A1 | 8/2008 | Marks et al. |

(56) References Cited

U.S. PATENT DOCUMENTS

| | | | | |
|---|---|---|---|---|
| 2008/0214272 | A1 | 9/2008 | Baerlocher et al. | |
| 2008/0227530 | A1 | 9/2008 | LeMay et al. | |
| 2008/0261684 | A1 * | 10/2008 | Vallejo et al. | 463/27 |
| 2008/0274788 | A1 | 11/2008 | Wilson | |
| 2009/0042645 | A1 | 2/2009 | Graham et al. | |
| 2009/0088244 | A1 | 4/2009 | Nicely et al. | |
| 2009/0088252 | A1 | 4/2009 | Nicely et al. | |
| 2009/0104964 | A1 | 4/2009 | Snow | |
| 2009/0111561 | A1 | 4/2009 | Dewaal et al. | |
| 2009/0111577 | A1 | 4/2009 | Mead | |
| 2009/0117993 | A1 | 5/2009 | Bigelow, Jr. et al. | |
| 2009/0124362 | A1 | 5/2009 | Cuddy et al. | |
| 2009/0124363 | A1 | 5/2009 | Baerlocher et al. | |
| 2009/0124364 | A1 | 5/2009 | Cuddy et al. | |
| 2009/0149241 | A1 | 6/2009 | Thomas | |
| 2009/0247267 | A1 | 10/2009 | Acres | |
| 2009/0253492 | A1 | 10/2009 | Caputo et al. | |
| 2010/0102507 | A1 | 4/2010 | Bontempo et al. | |
| 2010/0120496 | A1 | 5/2010 | Hoffman et al. | |

OTHER PUBLICATIONS

Let the Games Begin Article [online] [retrieved on Mar. 16, 2009]. Retrieved from the Internet at <URL: http://www.strictlyslots.com/archive/0509ss/legato_slots.html>. (18 pages).

How to Play Las Vegas Dreams [online] [retrieved on Feb. 27, 2009]. Retrieved from the Internet at <URL: http://www.biginstantwin.com/las_vegas_dreams.php>. (2 pages).

Mega Moolah Jackpot Wheel [online] [retrieved on Feb. 27, 2009]. Retrieved from the Internet at <URL: http://www.secretcasinoclub.dk/Screenshots/index.php?image_id=1930>. (2 pages).

Mega Moolah Online Progressive Slots [online] [retrieved on Feb. 27, 2009]. Retrieved from the Internet at <URL: http://www.allslotscasino.com/mega-moolah.html>. (4 pages).

Millionaires Club III [online] [retrieved on Feb. 27, 2009]. Retrieved from the Internet at <URL: http://www.allonlineslots.com/millionairesclub3.htm>. (2 pages).

Wheel of Fortune Advertisement, written by IGT, published prior to Aug. 25, 2009. (1 page).

Office Action issued Sep. 6, 2011 in parent application, U.S. Appl. No. 12/270,079.

Wheel of Fortune Article, written by IGT, published in 1997. (1 page).

Wheel of Fortune® Multi-Level Progressives [online] [retrieved on Feb. 27, 2009]. Retrieved from the Internet at <URL: https://www.igt.com/GamingGroup/Games/base.asp?pid=5.331>. (3 pages).

Wheel of Fortune Slots Advertisement, written by IGT, published in 2002. (1 page).

Wheel of Fortune Slots [online] [retrieved on Feb. 27, 2009]. Retrieved from the Internet at <URL: http://www.slotshero.com/slots/wheel-fortune/>. (3 pages).

* cited by examiner

FIG. 10C
500
502
504d
504a
504c
504b
$50
Progressive Award
$100
Wager more credits more quickly, the progressive award section is shrinking!

GAMING SYSTEM, GAMING DEVICE AND GAMING METHOD PROVIDING ADDITIONAL AWARD OPPORTUNITIES FOR AN ACTIVATION OF A SYMBOL GENERATOR BASED ON AN OCCURRENCE OF A TRIGGERING EVENT

PRIORITY CLAIM

This application is a continuation of, and claims priority to and the benefit of, U.S. patent application Ser. No. 12/569,178, filed on Sep. 29, 2009, which is a continuation-in-part of, and claims priority to and the benefit of, U.S. patent application Ser. No. 12/270,079, filed on Nov. 13, 2008, which issued as U.S. Pat. No. 8,262,458 on Sep. 11, 2012, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Many known gaming devices having bonus games employ a bonus game triggering event that occurs during the operation of the base game of the gaming device. The bonus game triggering event temporarily stalls or hafts further base game play and enables a player to enter a second, different game, which is the secondary or bonus game. The player plays the bonus game, likely receives a bonus award, and then can continue further plays of the base game. Certain known gaming devices include one or more wheels used to display bonus awards.

There is a continuing need to provide new and different gaming devices that increase the ability to obtain awards or provide different awards to players.

SUMMARY

The present disclosure relates to various embodiments of gaming systems, gaming devices, and gaming methods which provide a symbol generator where the number of awards available to be won in an activation of the symbol generator changes based on a first condition or triggering event and/or where the different types of awards available to be won in an activation of the symbol generator changes based on a second condition or triggering event. In certain embodiments, the number of awards available to be won in an activation of the symbol generator changes by joining two or more sections of the symbol generator and/or in certain embodiments, the different types of awards available to be won in an activation of the symbol generator changes by adding one or more awards to one or more of the sections of the symbol generator.

More specifically, one embodiment provides a gaming device having a symbol generator (such as a wheel) having a plurality of sections which each include one of a plurality of outcomes (such as one of a plurality of award symbols which represent one of a plurality of awards). Upon an occurrence of a first triggering event or joinder triggering event, the gaming device joins or merges a plurality of the sections of the symbol generator to form a joined section. If the gaming device indicates the joined section as a result of an activation of the symbol generator, the gaming device provides the player each of the outcomes or awards associated with that joined section (i.e., each of the outcomes or awards associated with each of the sections which are joined into that joined section). If one of the non-joined sections is indicated, the gaming device provides the player the award associated with that indicated section. The gaming device thus provides the player the opportunity to win multiple awards for a single activation of the symbol generator.

In another embodiment, a size of one or more sections that includes a progressive award dynamically changes upon an occurrence of a first triggering event or a progressive award display change triggering event, such as a designated amount of coin-in, a designated rate of coin-in or a value of the progressive award being increased at a designated rate. In this embodiment, each of the awards or sections are associated with or has a probability of being generated or indicated. The probability of indicating the progressive award dynamically changes upon an occurrence of a progressive award display change triggering event. In certain embodiments, the gaming device changes a displayed size of a progressive award section of the symbol generator or adds or removes a progressive award from the symbol generator thus changing a displayed allocation of the progressive award on the symbol generator based upon an occurrence of a progressive award display change triggering event.

In one embodiment, for each section, the displayed allocation or size of an award or section on the symbol generator represents or approximately represents that probability of the gaming device generating the award or outcome upon an activation of the symbol generator. In other embodiments, the displayed allocation or size of an award or section on the symbol generator does not represent the probability of the gaming device generating the award or outcome upon an activation of the symbol generator. Upon an occurrence of a progressive award display change triggering event, the probability of indicating the progressive award changes.

More specifically, in one embodiment, the probability of generating the progressive award on the symbol generator changes proportionally based on an amount or value of coin-in. For example, when coin-in increases by a first $200, the probability of generating the progressive award section of the symbol generator increases by 1%. In one embodiment, the displayed allocation of the progressive award on the symbol generator also changes proportionally based on an amount or value of coin-in. For example, in one embodiment, when coin-in increases by a first $200, the size of the progressive award section of the symbol generator increases by 1% and the probability of generating the progressive award section of the symbol generator increases by 1%. When coin-in increases by a next $200, the size of the progressive award section of the symbol generator increases by a further 1% and the probability of generating the progressive award section of the symbol generator increases by a further 1%.

In another embodiment, the probability of generating the progressive award on the symbol generator changes based on a rate of coin-in. For example, when the rate of coin-in increases to $10 a minute, in one embodiment, the probability of generating or indicating the progressive award section of the symbol generator increases by 1%. When the rate of coin-in increases to $20 a minute, the probability of generating the progressive award section of the symbol generator increases by 2%. In this embodiment, when the rate of coin-in decreases to $5 a minute, the probability of generating the progressive award section of the symbol generator decreases by 1.5%. In certain embodiments, the progressive award increases as a percentage of coin-in. Therefore, as the rate of coin-in increases, the value of the progressive award increases at a progressive award growth rate based on the coin-in. In one embodiment, the size of the progressive award section of the symbol generator also increases based on the rate or of growth. Therefore, in certain embodiments, as the value of the progressive award increases or the progressive award growth rate increases to a designated rate, the probability of the gaming device generating or indicating the progressive award increases upon an activation of the symbol generator.

More specifically, in one embodiment, upon an occurrence of a progressive award display change triggering event, the gaming device changes the dimensions or size of the section including the progressive award. For example, when coin-in reaches a certain rate, the gaming device enlarges the section that includes the progressive award and increases the probability of generating the progressive award section. Therefore, the gaming device has a greater chance of indicating the section including the progressive award upon an activation of the symbol generator. In another example, upon an occurrence of a different progressive award display change triggering event (such as a designated lower rate of coin-in), the gaming device minimizes or reduces the size of one of the sections that includes the progressive award and decreases the probability of generating the progressive award section. Therefore, the gaming device has a lesser chance of indicating the section that includes the progressive award during an activation of the symbol generator.

In one embodiment, upon an occurrence of a progressive award display change triggering event, the gaming device changes one of the displayed non-progressive awards or outcomes of the sections to a progressive award. That is, the gaming device removes a non-progressive award from the symbol generator and replaces the non-progressive award with a progressive award.

In another embodiment, upon an occurrence of a progressive award display change triggering event, the gaming device adds a progressive award to the symbol generator without removing any other awards. For example, the symbol generator has four non-progressive award sections and each of the sections is allocated to 25% of the symbol generator. Upon the occurrence of a progressive award display change triggering event, the gaming device adds a progressive award section to the symbol generator, decreasing the size of one or more of the original non-progressive sections of the symbol generator.

Another embodiment provides a gaming device having a symbol generator (such as a wheel) having a plurality of sections which each include one of a plurality of initial outcomes (such as one of a plurality of award symbols which represent one of a plurality of initial awards). Upon an occurrence of a second or award adding triggering event, the gaming device adds one or more supplemental awards to the symbol generator and specifically to one or more of the sections of the symbol generator. If the gaming device indicates the section associated with a supplemental award as a result of an activation of the symbol generator, the gaming device provides the supplemental award to the player in addition to the initial award associated with that section. The gaming device thus provides the player the opportunity to win both an initial award and a supplemental award for a single activation of the symbol generator.

Another embodiment provides a gaming device having a symbol generator (such as a wheel) including a plurality of sections which each include an initial outcome (such as an award symbol which represents one of a plurality of initial awards). Upon an occurrence of a first or joinder triggering event, the gaming device joins one or more sections of the symbol generator. Upon an occurrence of a second or award adding triggering event, the gaming device adds one or more supplemental awards to one or more sections of the symbol generator. In one such embodiment, the first or joinder triggering event and the second or award adding triggering event are different events. In another such embodiment, the first or joinder triggering event and the second or award adding triggering event are a same event. That is, the gaming device joins a plurality of sections and also adds one or more supplemental awards to the symbol generator upon an occurrence of that single triggering event. Therefore, for a single activation of the symbol generator, the player may win one or more initial awards and one or more supplemental awards.

It should be appreciated that the triggering events may be any suitable triggering events, including but not limited to: (a) a primary game outcome, (b) a wager amount, (c) a number of paylines wagered on in a primary game, (d) a player's ranking (such as determined through a player tracking system), (e) a bonus level, (f) a number of primary games played, (g) a designated number of credits wagered over a designated number of primary games, (h) a player playing a gaming device for a designated amount of time, (i) winning a designated number of points during game play, (j) a player placing a side wager, (k) a randomly determined event in one or more plays of a primary game (such as a symbol combination), (l) a randomly determined event separate from plays of a primary game, and (m) an accumulated wager pool.

It should also be appreciated that the changes to the symbol generator may depend on the type of triggering event.

It should be appreciated that the various embodiments disclosed herein may be employed as part of a primary game or as part of a secondary game.

The changes to the symbol generator may in various embodiments remain for any suitable period. For example, a change to the symbol generator may last for: (a) a single play of the primary game; (b) a designated number of plays of the primary game; (c) a designated period of time; (d) an entire gaming session by a player; and (e) until the symbol generator is activated (such as to provide an award to the player).

It should be appreciated that the probabilities of generating each section of the symbol generator may stay the same or may vary after a joinder event. It should be appreciated that the determination of which sections will be joined may be made in any suitable manner. It should also be appreciated that the probability of indicating the joined section during an activation of the symbol generator may be determined in any suitable manner. In one embodiment, the probability of obtaining the awards associated with the joined section for a single activation of the symbol generator are increased alter the joinder of the sections. For example, in one embodiment, the probability of the joined section being indicated or generated during an activation of the symbol generator is greater than each of the probabilities of being indicated associated with the sections that were joined before the sections were joined. In one embodiment, the joined section has a probability of being indicated that is equal to the sum of probabilities of being indicated associated with each of the individual joined sections. It should also be appreciated that the probabilities of generating each section of the symbol generator may stay the same or may vary after an award adding triggering event.

It should be appreciated that the awards, outcomes, initial awards and supplemental awards of the symbol generator may be any suitable awards or outcomes including but not limited to: numbers of credits, numbers of points, numbers of free activations, bonus game entries, modifiers, multipliers, a physical prize, an entry into a tournament, and a progressive award.

Accordingly, one advantage of the gaming system disclosed herein is to provide a player an opportunity to win a plurality of awards based on joined sections of a symbol generator during a single activation of the symbol generator.

Another advantage of the gaming system disclosed herein is to provide a player an opportunity to win an award and a supplemental award of a symbol generator during a single activation of the symbol generator.

Another advantage of the gaming system disclosed herein is to provide a player an opportunity to win a plurality of awards based on joined sections of a symbol generator during a single activation of the symbol generator and to provide a player an opportunity to win a supplemental award of a symbol generator during a single activation of the symbol generator.

Additional features and advantages are described herein, and will be apparent from the following Detailed Description and the figures.

BRIEF DESCRIPTION OF THE FIGURES

FIGS. 10A, 10B and 10C are screen shots illustrating one embodiment of the gaming device changing the size of a progressive award section based on an amount of coin-in.

DETAILED DESCRIPTION

The present disclosure may be implemented in various configurations for gaming devices, gaming devices, or gaming systems, including but not limited to: (1) a dedicated gaming device, gaming machine, or gaming systems wherein the computerized instructions for controlling any games (which are provided by the gaming device or gaming device) are provided with the gaming device or gaming device prior to delivery to a gaming establishment; and (2) a changeable gaming device, gaming machine, or gaming system wherein the computerized instructions for controlling any games (which are provided by the gaming device or gaming machine) are downloadable to the gaming device or gaming device through a data network after the gaming device or gaming machine is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
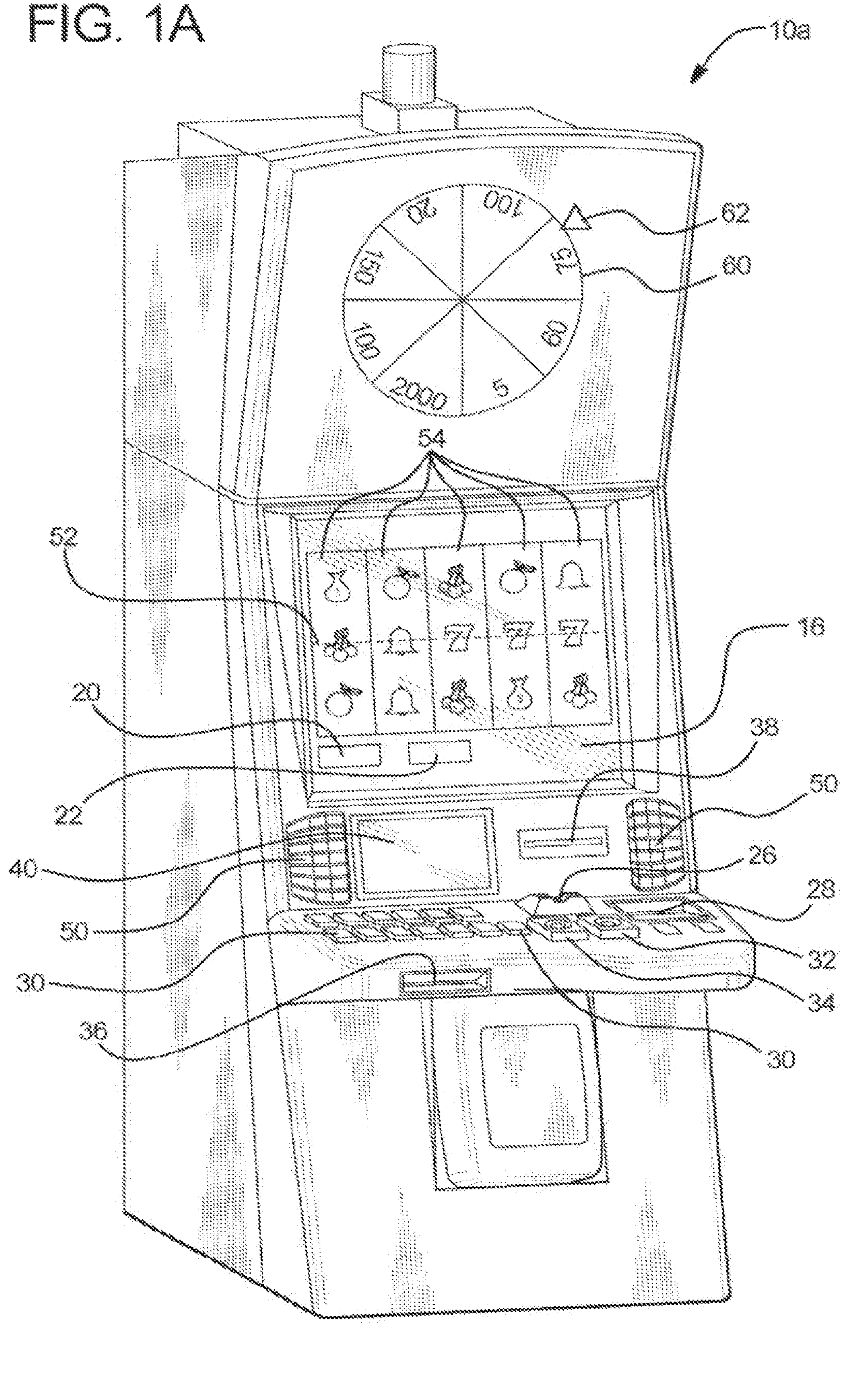
FIGS. 1A and 1B are front perspective views of alternative embodiments of gaming devices disclosed herein.
Figure 1B:
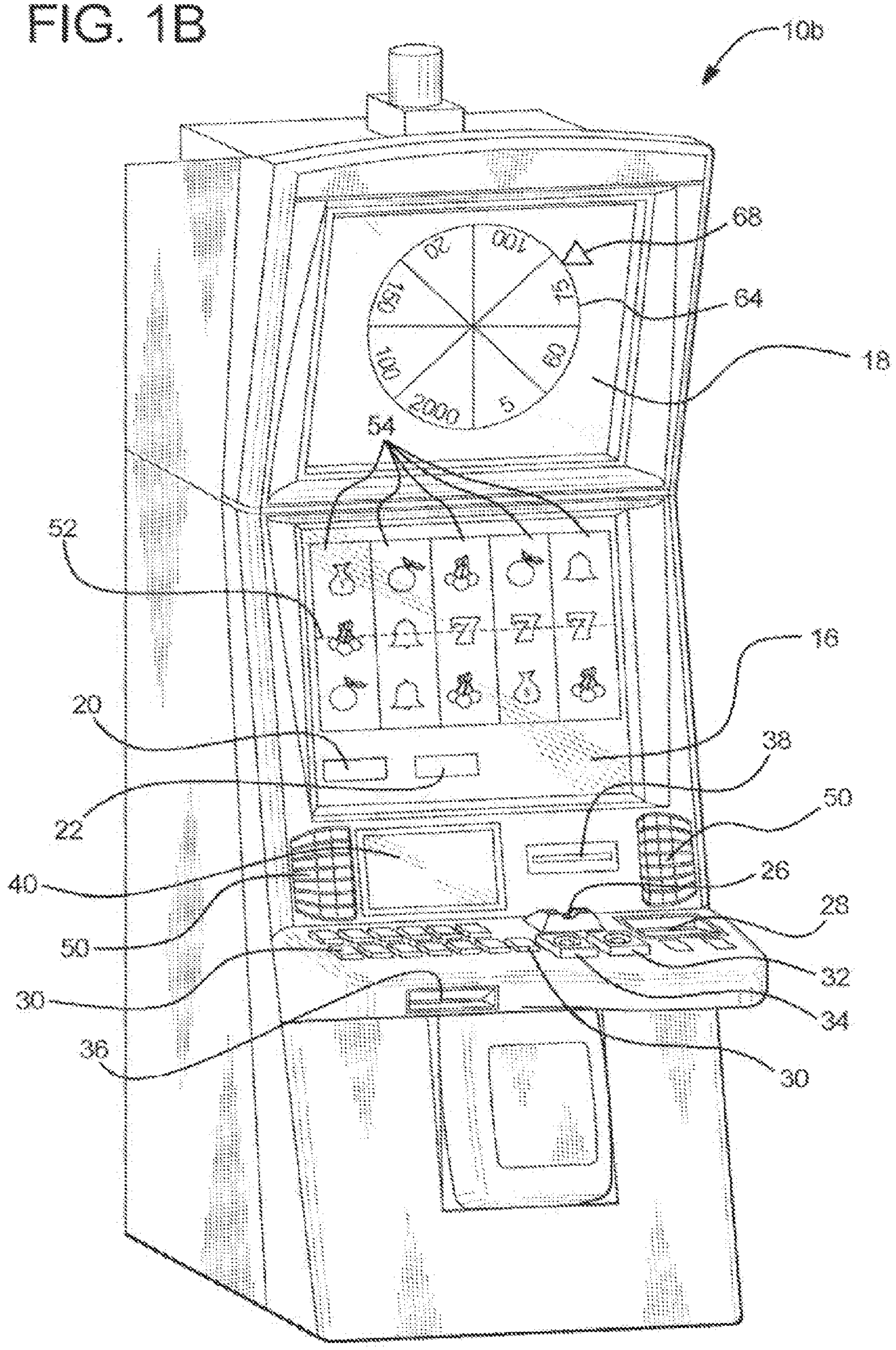

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming device. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
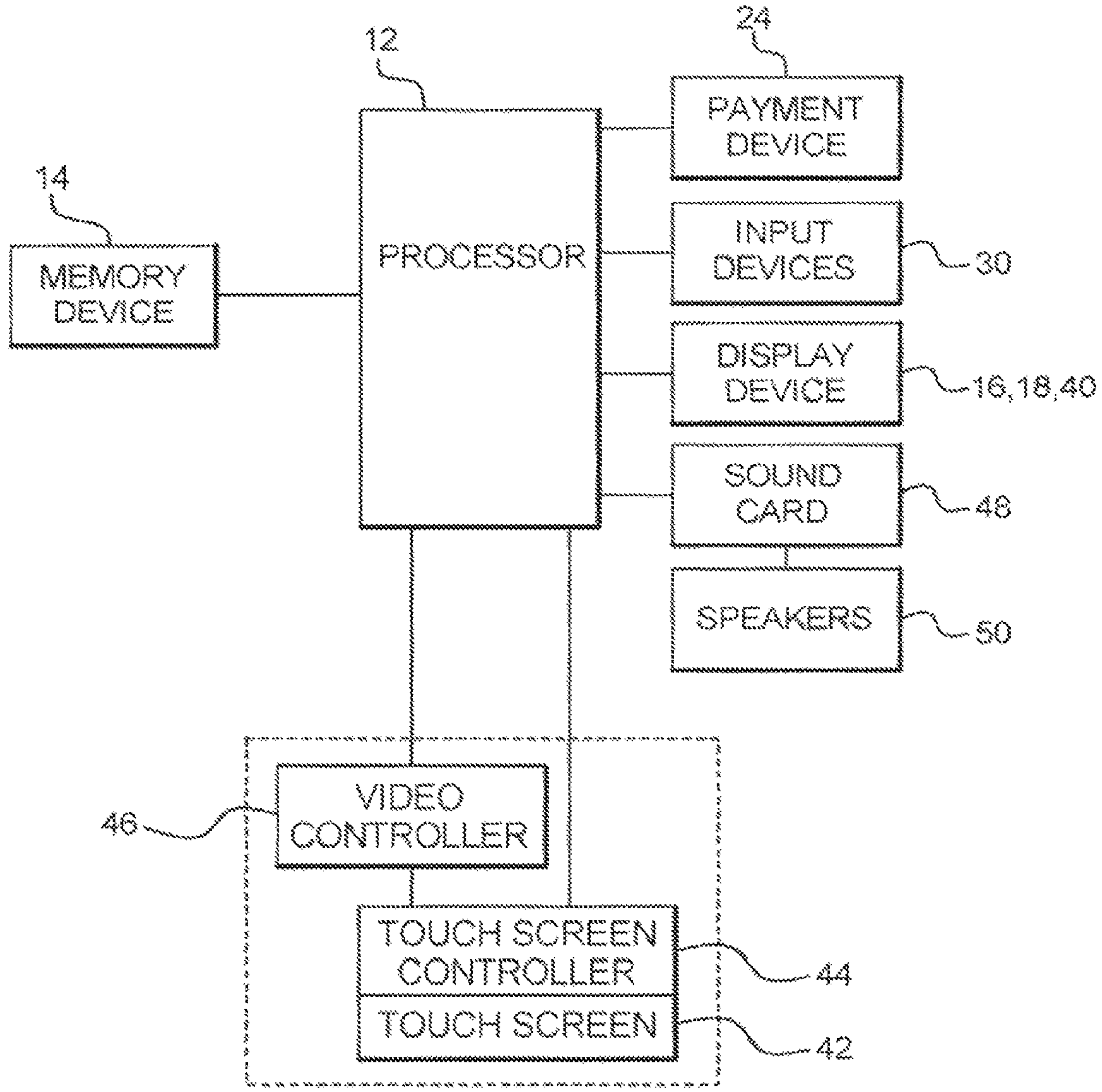
FIG. 2A is a schematic block diagram of the electronic configuration of one embodiment of a gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming device disclosed herein is operable over a wireless network, for example part of a wireless gaming system. In this embodiment, the gaming device may be a hand-held device, a mobile device, or any other suitable wireless device that enables a player to play any suitable game at a variety of different locations. It should be appreciated that a gaming device or gaming device as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, such as the wheel 60 and indicator 62 of FIGS. 1A and 1B, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming device may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming device or device may include some or all of the features of conventional gaming devices or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming device enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a whining symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming device deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
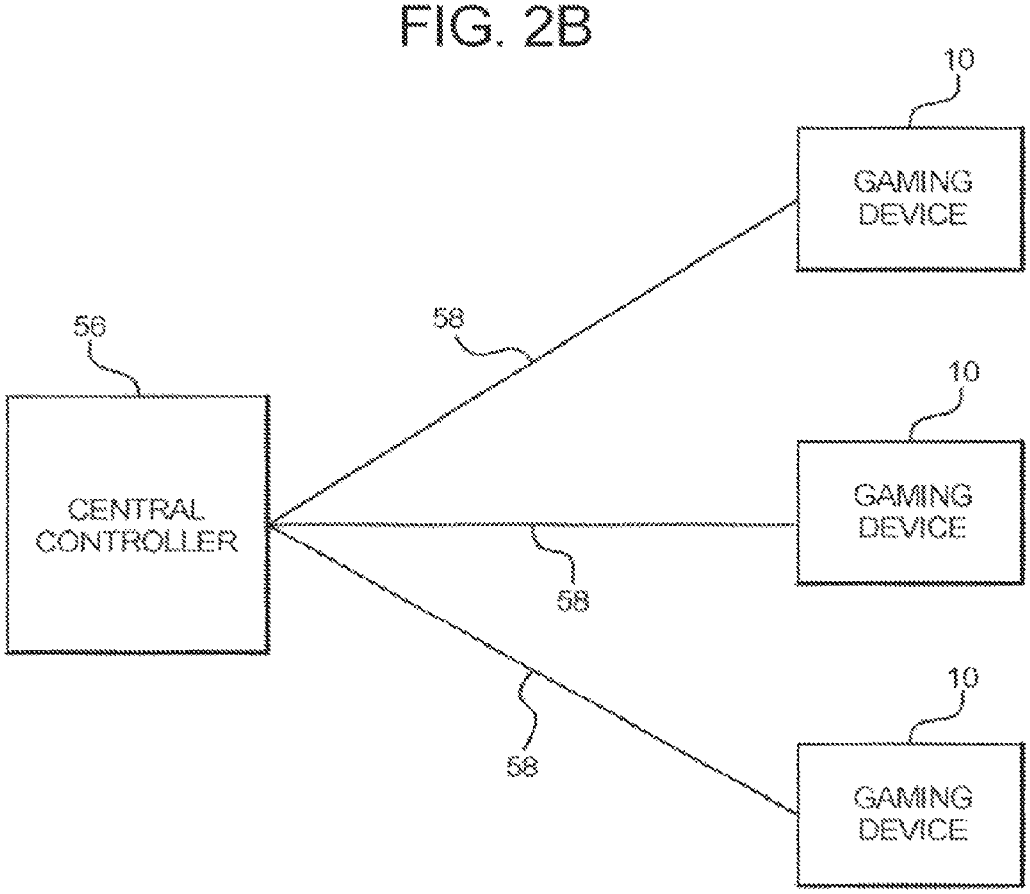
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming device in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaining sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming device may trigger a progressive award win. In another embodiment, a central server (or the progressive gaming system host site computer) determines when a progressive award win is triggered. In another embodiment, an individual gaming device and a central controller (or progressive gaming system host site computer) work in conjunction with each other to determine when a progressive win is triggered, for example through an individual gaming device meeting a predetermined requirement established by the central controller.

In one embodiment, a progressive award win is triggered based on one or more game play events, such as a symbol-driven trigger. In other embodiments, the progressive award display change triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming devices in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming device. In another embodiment, no minimum wager level is required for a gaming device to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Secondary Game Including a Symbol Generator

Figure 3A:
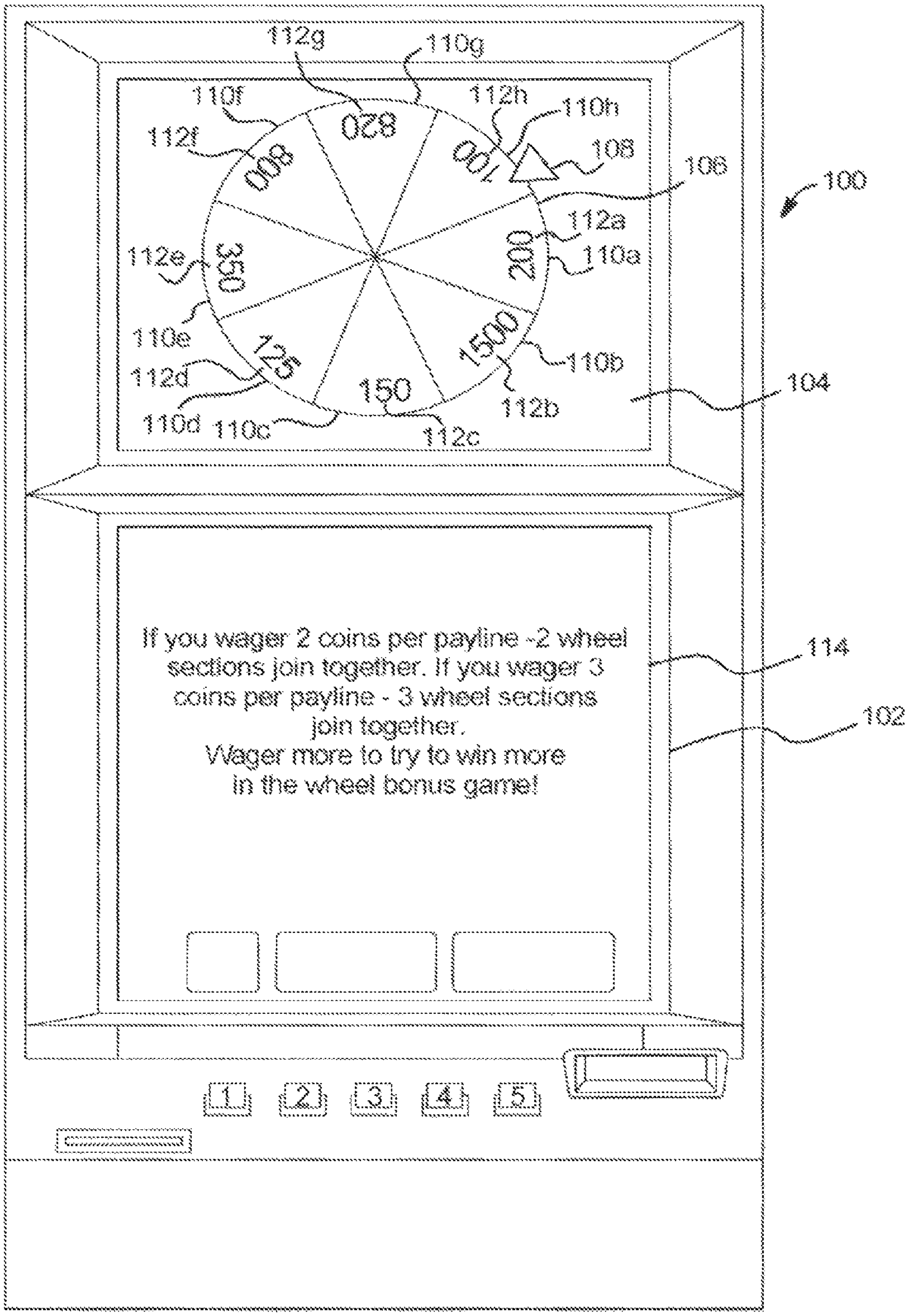
FIGS. 3A, 3B, 3C, 3D, 3E, and 3F are front views of one embodiment of a gaming device joining sections of a symbol generator upon an occurrence of a triggering event and providing each of the awards of the joined section to the player in a bonus game if the joined section is indicated.

As illustrated in FIGS. 3A, 3B, 3C, 3D, 3E, and 3F, in one embodiment, the gaming device 100 includes a symbol generator 106, such as a wheel, that includes a plurality of sections 110*a*, 110*b*, 110*c*, 110*d*, 110*e*, 110*f*, 110*g*, and 110*h*. Each section respectively includes one of a plurality of different outcomes such as awards 112*a*, 112*b*, 112*c*, 112*d*, 112*e*, 112*f*, 112*g*, and 112*h*. The gaming device also includes at least one indicator 108. In one embodiment, based on a suitable condition or joinder triggering event, the gaming device displays the joining or a connection of two or more of the sections of the wheel when that triggering event or condition occurs. The joinder triggering event may be any suitable triggering event. For example, as illustrated in FIG. 3A, the primary display device 102 of the gaming device informs the player that if the player wagers two coins or credits per payline in the base game, the gaming device will join two of the wheel sections together for a play of the bonus game if a bonus game triggering event occurs in or associated with that play of the base game. In this example embodiment, if the player wagers three coins or credits per payline in the base game, the gaming device will join three of the wheel sections together for a play of the bonus game if a bonus game triggering event occurs in or associated with the play of the base game.

In this illustrated embodiment, when a plurality of sections merge together and when the gaming device indicates the merged or joined sections, the player receives the sum of the awards or all of the outcomes of those sections. That is, instead of just receiving one award, the player's opportunity to receive more than one award in a single activation of a symbol generator is based on an occurrence of a joinder triggering event or condition.

Figure 3B:
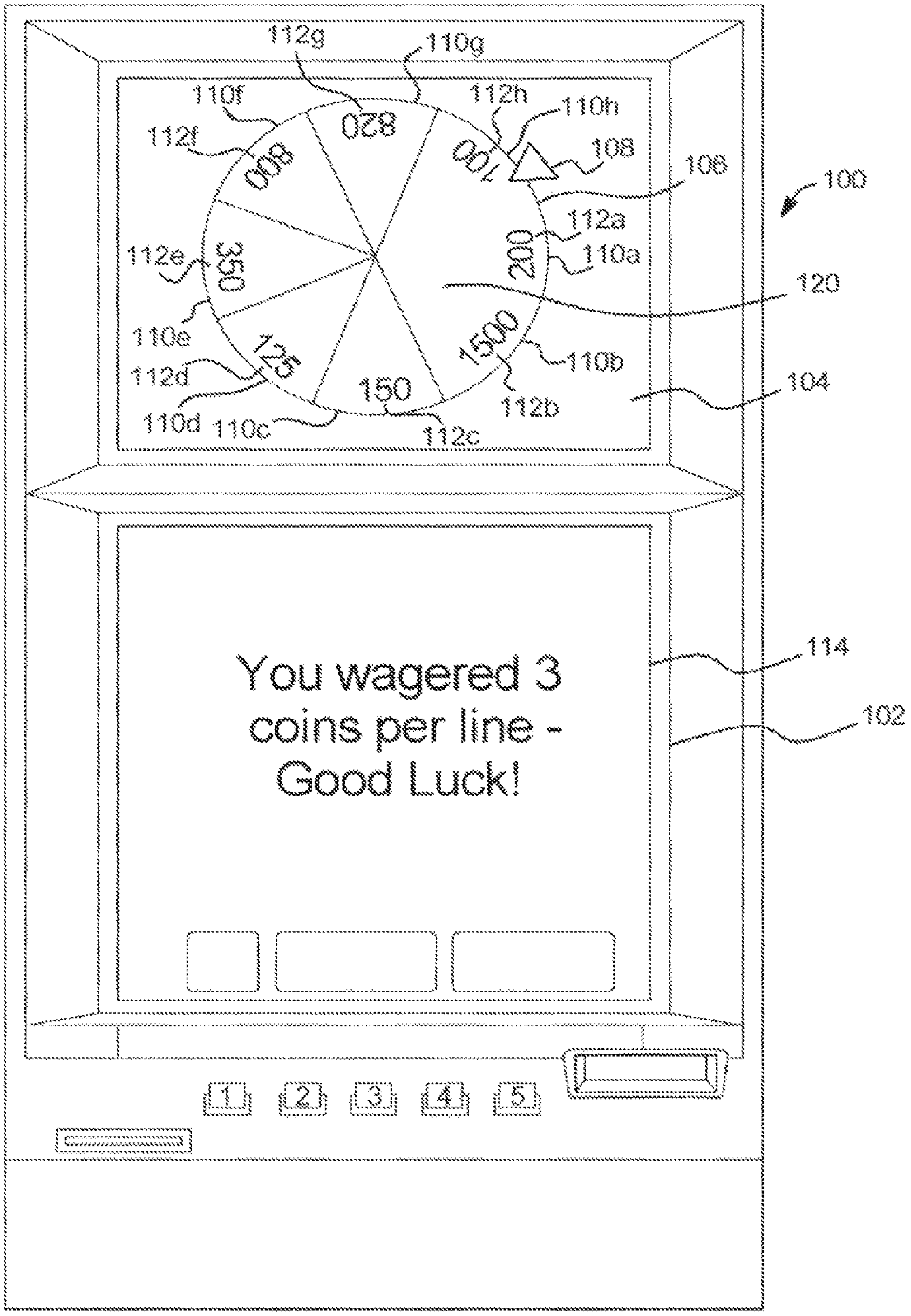

As illustrated in FIG. 3B, the player wagered three coins per payline, and therefore, as illustrated in FIG. 3B, the gaming device joins three of the sections 110*h*, 110*a*, and 110*b* together to form one section 120. Which sections are joined can be determined in any suitable manner. Additionally, the probability of that section being generated can be the sum of the probabilities of generating each of the sections individually or can be determined in other suitable manners. The awards (i.e., 100, 200, and 1500) of those sections 112*h*, 112*a*, and 112*b* are displayed on a single section 120. It should also be appreciated that the sum of the awards can be displayed instead of separately displaying each of the awards. The sum of these awards will be provided to the player upon indication of this section in a play of the bonus game.

Figure 3C:
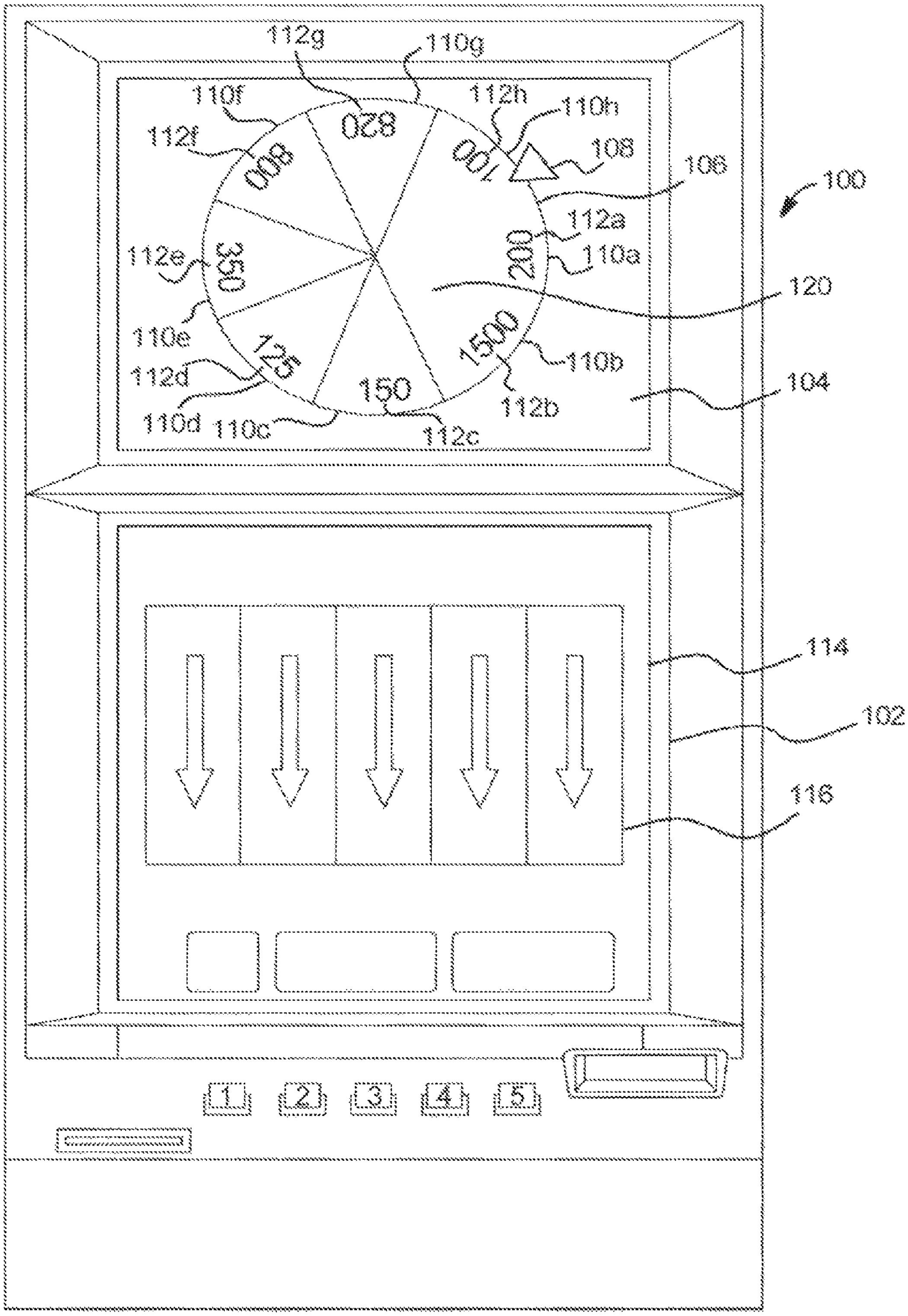
Figure 3D:
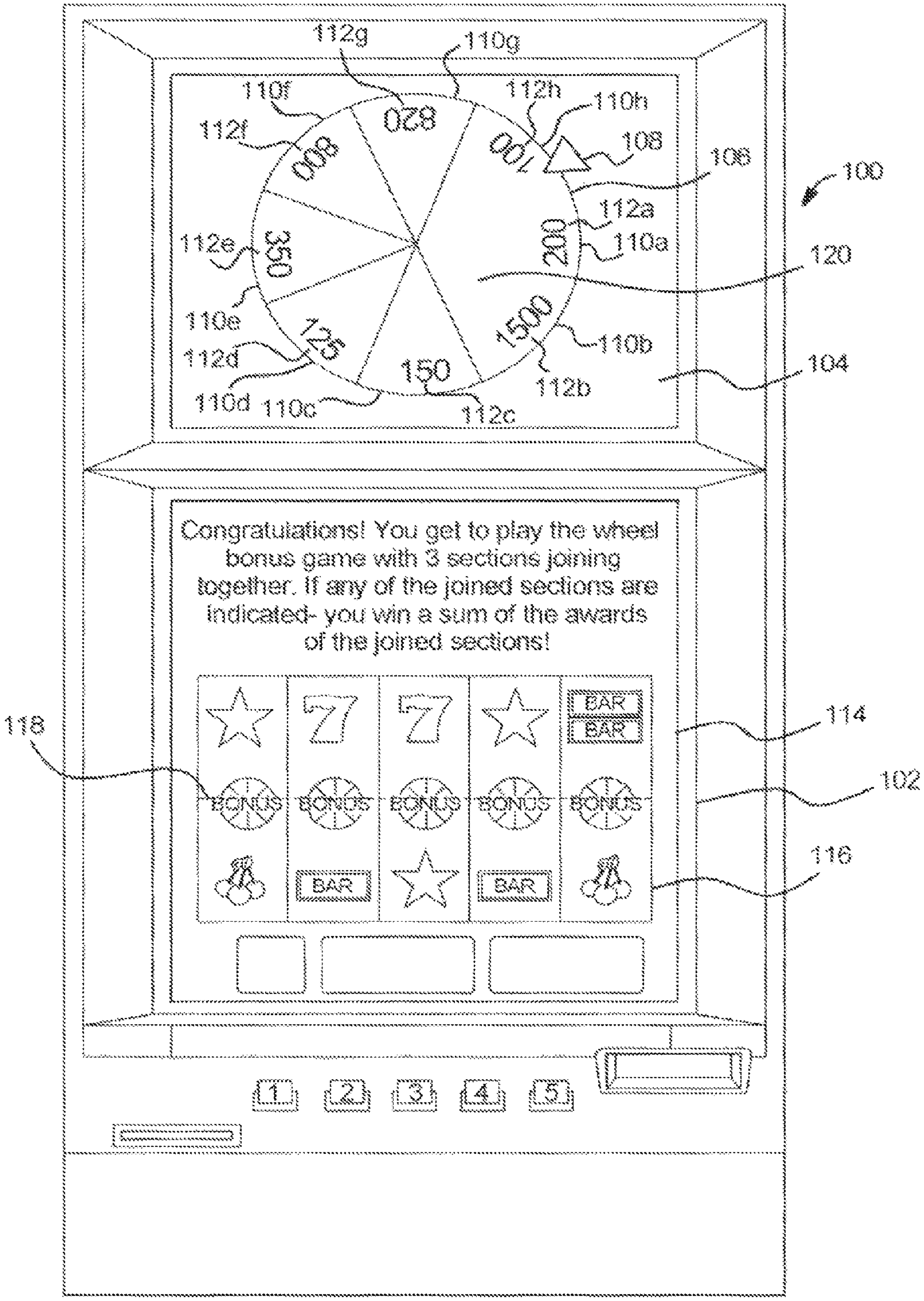

As illustrated in FIG. 3C, the player spins the reels in a base game 116 of the gaming device. As illustrated in FIG. 3D, the gaming device informs the player that a bonus triggering event occurred and enables the player to play the bonus game with three sections joined together. It should be appreciated that the bonus game triggering event may be any suitable triggering event. In the illustrated embodiment, the secondary game or bonus triggering event is a plurality of wheel symbols being indicated or generated on the payline 118 in the base game. If the joined section is indicated, then the player receives each of the awards of that joined section.

Figure 3E:
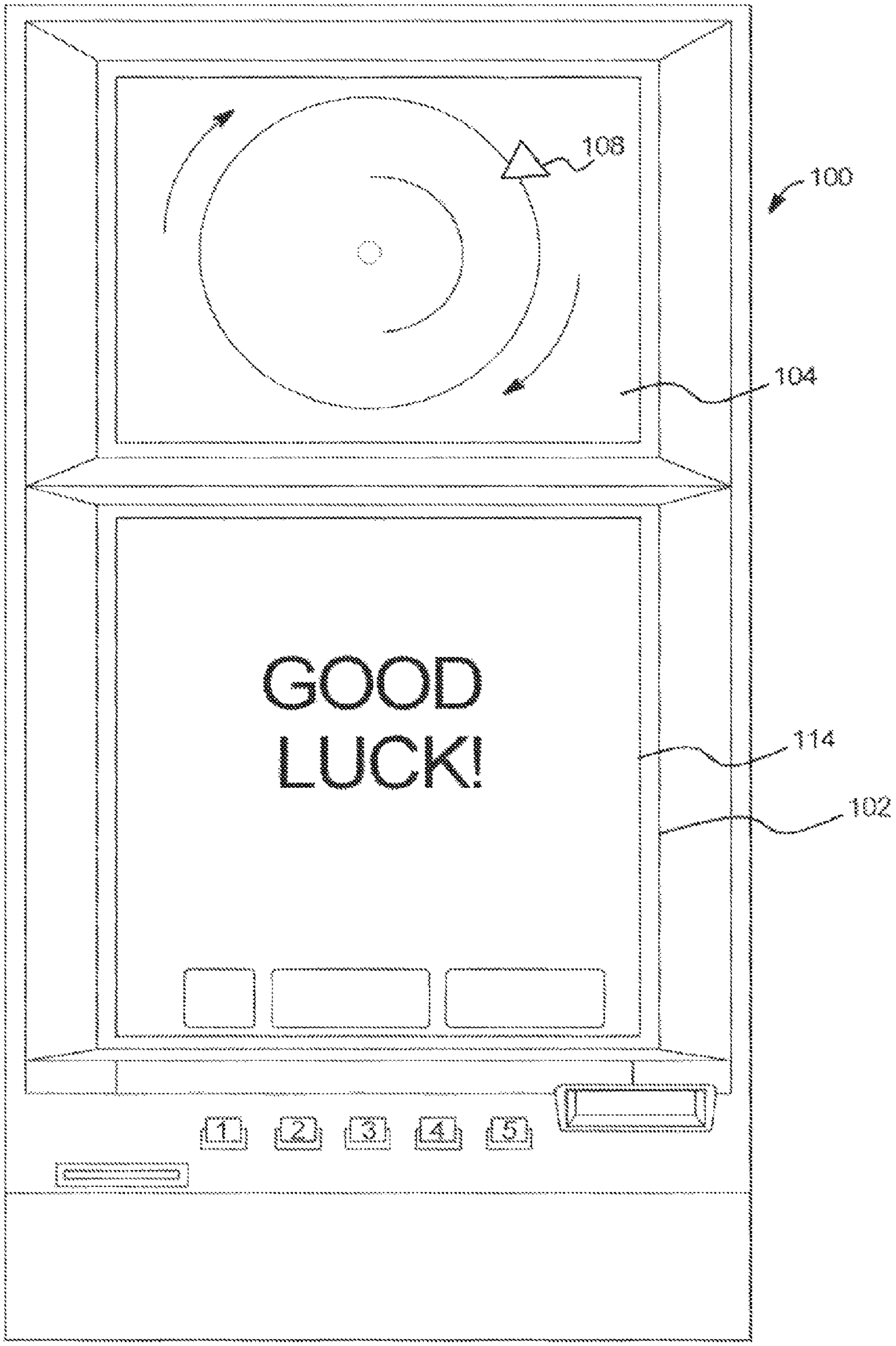
Figure 3F:
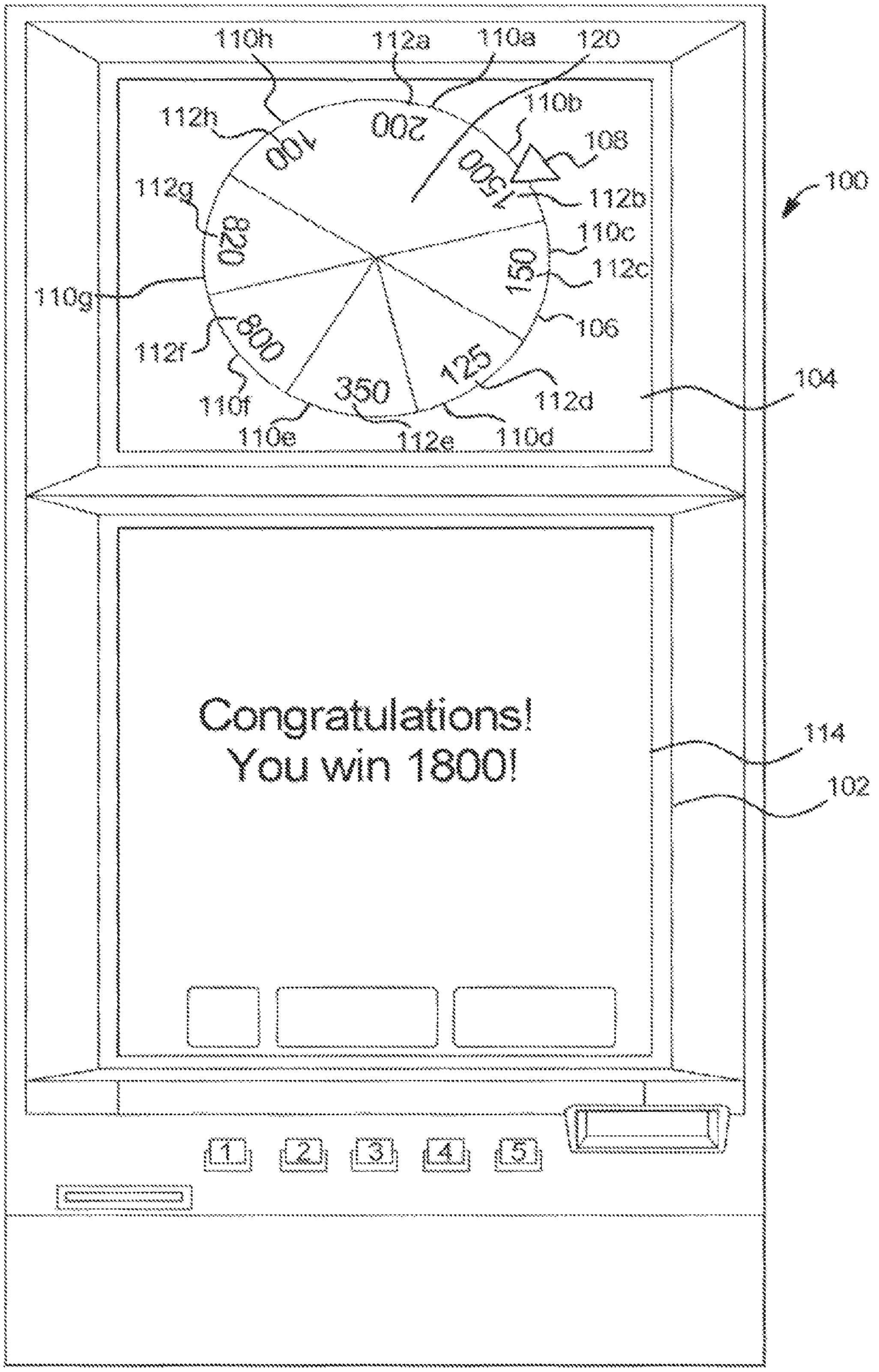

As illustrated in FIG. 3E, the gaming device spins the wheel. It should be appreciated that the gaming system may rotate the wheel upon an input from the player or upon initiation of the gaming device. As illustrated in FIG. 3F, the gaming device indicates the joined section 120. Therefore, in addition to winning the 1500 credits the player also wins the 200 credits and the 100 credits of the joined section. The player wins a total of 1800 credits for the single activation of the symbol generator.

It should be appreciated that the awards of the symbol generator are not limited to credit awards as illustrated in FIGS. 3A to 3F, but may include any other awards such as free games, free spins, multipliers or any other suitable award.

Figure 4A:
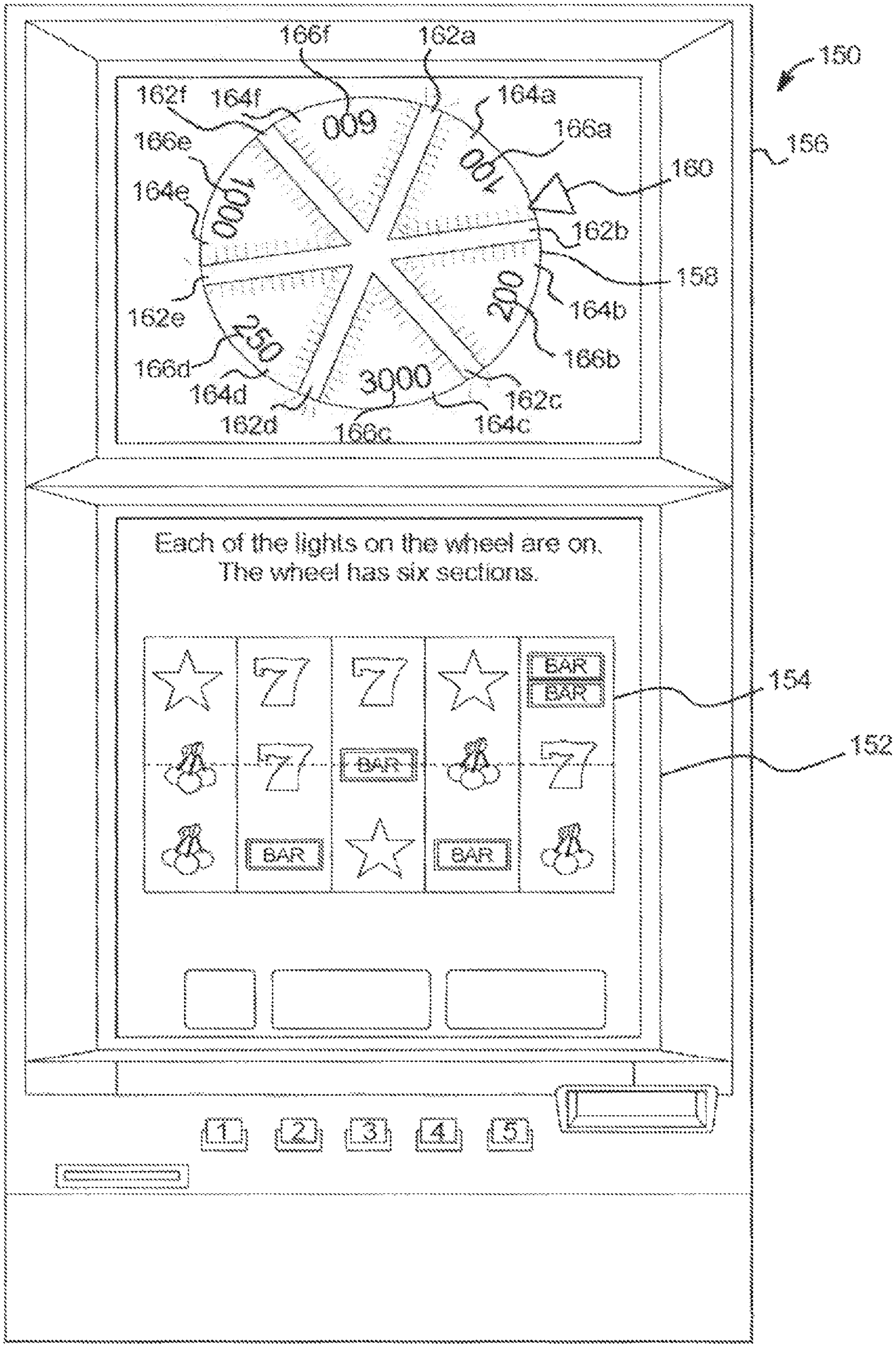
FIGS. 4A and 4B are front views of one embodiment of a gaming device joining sections of a symbol generator upon an occurrence of a triggering event and providing each of the awards of the joined sections to the player in a bonus game if the joined section is indicated, wherein the sections are indicated by lights between the sections and the gaming device joins and unjoins the sections by illuminating the lights.
Figure 4B:
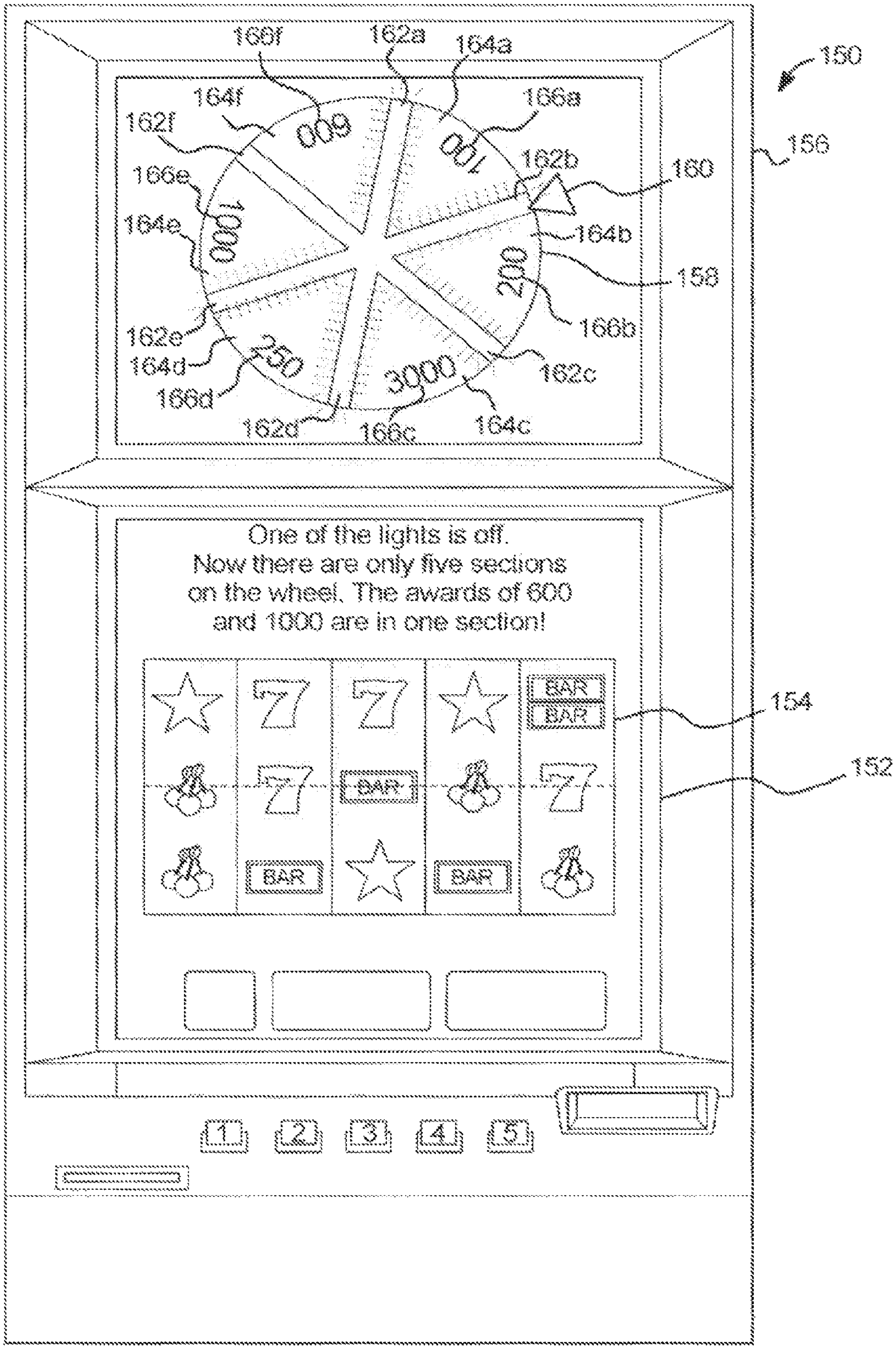

As illustrated in FIGS. 4A and 4B, in one embodiment, the gaming device 150 includes a primary display 152 that displays a primary game 154, and a secondary display 156 that includes a mechanical symbol generator in the form of a wheel 158. The gaming device also includes an indicator 160 for the mechanical symbol generator or wheel. In the illustrated embodiment, the mechanical symbol generator includes sections 164*a*, 164*b*, 164*c*, 164*d*, 164*e* and 164*f*, which each include one of a plurality of awards 166*a*, 166*b*, 166*d*, 166*d*, 166*e*, and 166*f* respectively. In this embodiment, the symbol generator includes a plurality of lights 162*a*, 162*b*, 162*c*, 162*d*, 162*e*, and 162*f*. These lights define the sections of the symbol generator. That is, when each of the lights are on, the symbol generator includes or indicates six sections. When one or more of these lights are not illuminated, a plurality of the sections are joined and the symbol generator indicates or includes less than six sections. Thus, these lights are employed to indicate the joining of the sections.

As illustrated in FIG. 43, five of the six lights 162*a*, 162*b*, 162*c*, 162*d*, and 162*e* are illuminated. One of the lights is not illuminated 162*f*. Therefore, sections 164*e* and 164*f* are joined. If the gaming device indicates this joined section in an activation of the wheel, the gaming device provides the player with two awards, namely 600 and 1000. Therefore, the player may win more than one award from a single activation of the wheel or symbol generator.

It should be appreciated that the sections of the symbol generator may be defined in suitable manner or by any suitable type of lighting, including but not limited to light emitting diodes (LEDs), organic light-emitting diodes (OLEDs), polymer light-emitting diodes (PLEDs), surface-conduction electron-emitters (SEDs), a display including a projected and/or reflected images or lighting, and/or refracted images or lighting or any other suitable electronic device or display mechanism.

It should thus be appreciated that the symbol generator may be any suitable type of symbol generator, such as a mechanical symbol generator or video symbol generator and the sections may be indicated, joined or merged in any suitable manner. In one embodiment, adjacent sections are joined together. In another embodiment, two or more sections which are not adjacent can be joined together. For example, the gaming system may indicate grouped sections by displaying each of the sections in different colors. The sections that are the same color are in the same group or are joined or merged. In another embodiment, the awards that are the same color are in the same group or are joined or merged. In another embodiment, a secondary symbol is assigned to one or more of the sections indicating that the sections are joined and merged. For example, each of the sections includes a secondary symbol and the sections with the same secondary symbols are the joined or merged sections. In one embodiment, the gaming system includes lights around the outside of the symbol generator that define which sections are joined or define the sections. In another embodiment, the mechanical symbol generator includes background lights that define the sections.

In another embodiment, as illustrated in FIGS. 5A, 5B, 5C and 5D, the gaming device 200 includes a primary display 202 and a secondary display 206. In the illustrated embodiment, the secondary display includes a symbol generator 208. The symbol generator is associated with an indicator 210. The symbol generator includes a plurality of sections 212*a*, 212*b*, 212*c*, 212*d*, 212*e*, and 212*f*. In the illustrated embodiment, these sections respectively include awards 214*a*, 214*b*, 214*c*, 214*d*, 214*e*, and 214*f*. In this embodiment, one or more awards or outcomes are added to one or more sections based on an occurrence of an award adding triggering event. The award adding triggering event may be any suitable triggering event. In the illustrated embodiment, the award adding triggering events are symbol combinations in the base game. If the player obtains two star symbols on the payline in the base game, the gaming device provides the player the opportunity to win one supplemental award during a single activation of the symbol generator. If the player obtains three star symbols on the payline in the base game, the gaming device provides the player the opportunity to win one of two supplemental awards during a single activation of the symbol generator. If a player obtains five star symbols on the payline in the primary game, five supplemental awards are added to the symbol generator.

Figure 5A:
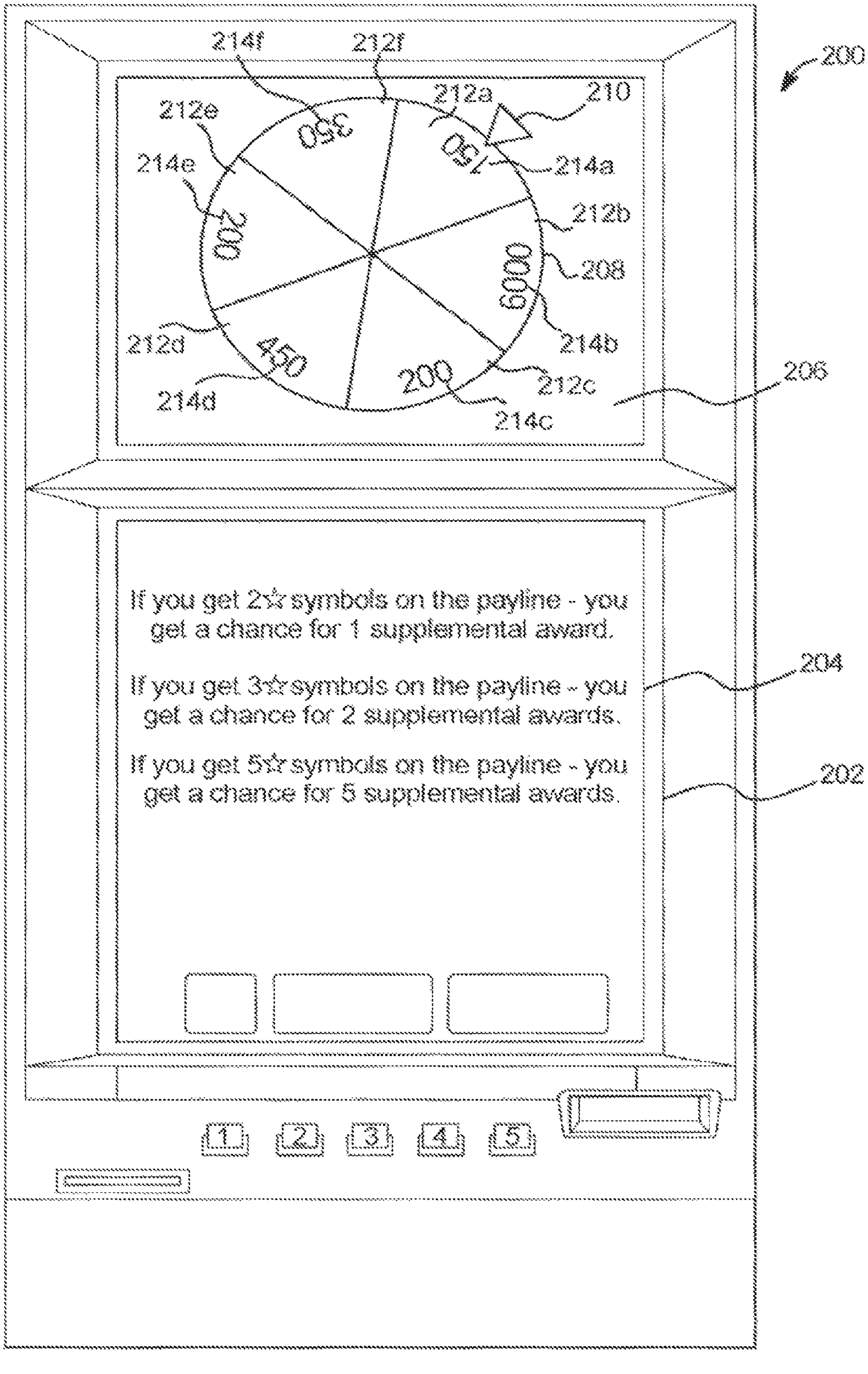
FIGS. 5A, 5B, 5C and 5D are front views of one embodiment of a gaming device adding a supplemental award to a symbol generator upon an occurrence of a triggering event.
Figure 5B:
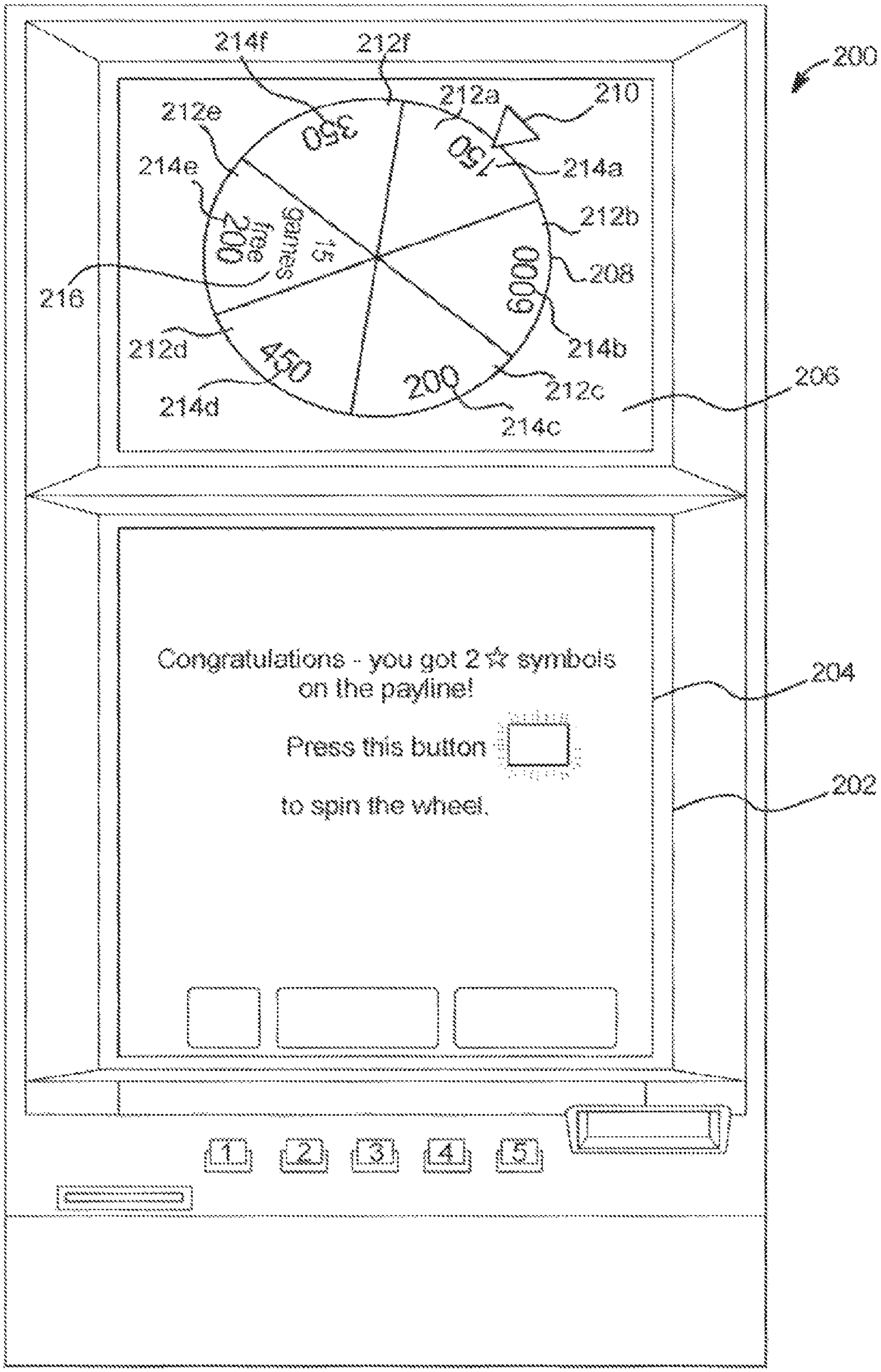
Figure 5C:
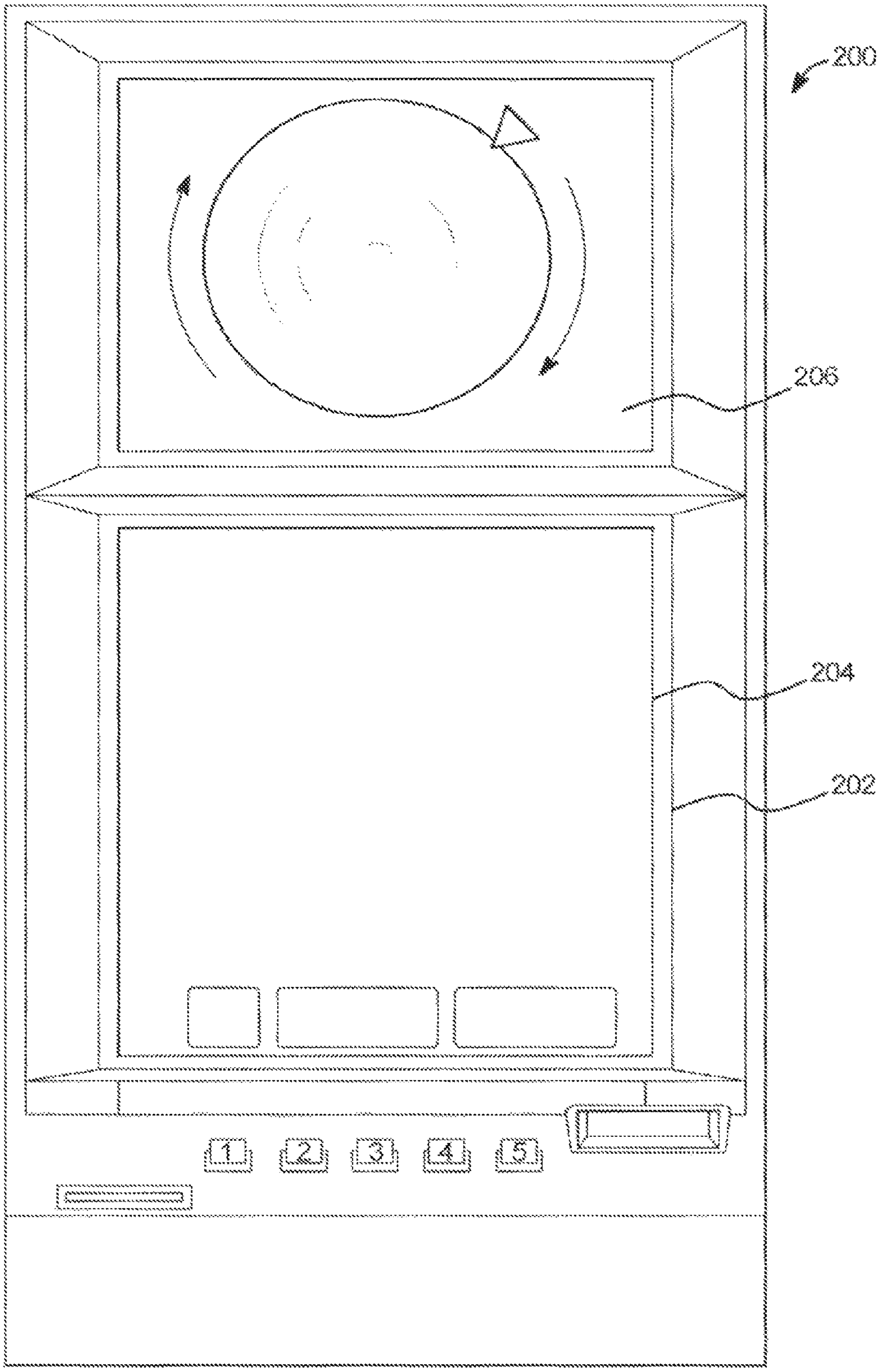
Figure 5D:
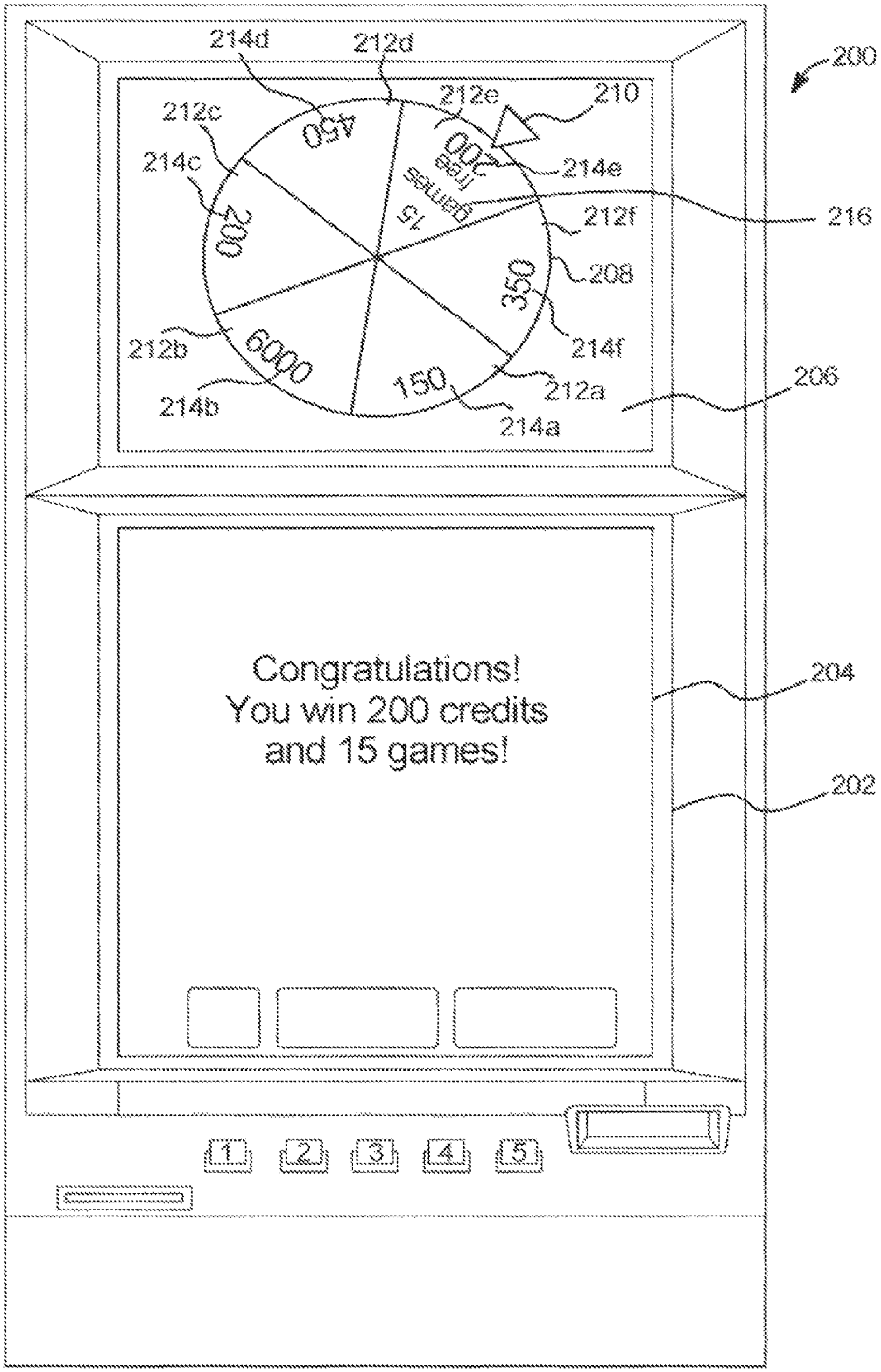

As illustrated in FIG. 5B, the gaming device informs the player that the player obtained two star symbols on the payline in the primary game and to press a button to spin the wheel. The supplemental award of 15 free games 216 was added to section 212*e* of the symbol generator. As illustrated in FIG. 5C, the gaming device spins or rotates the symbol generator. As illustrated in FIG. 50, the gaming device indicates the section 212*e* that includes the primary award 214*e* of two hundred and the supplemental award 216 of fifteen free games. Therefore, the player receives both the primary award and the supplemental award.

As illustrated in FIGS. 5A, 5B, 5C, and 5D, in one embodiment, the gaming device both adds a supplemental award to the symbol generator and provides the player a play of the bonus game upon an occurrence of a same triggering event.

Figure 6A:
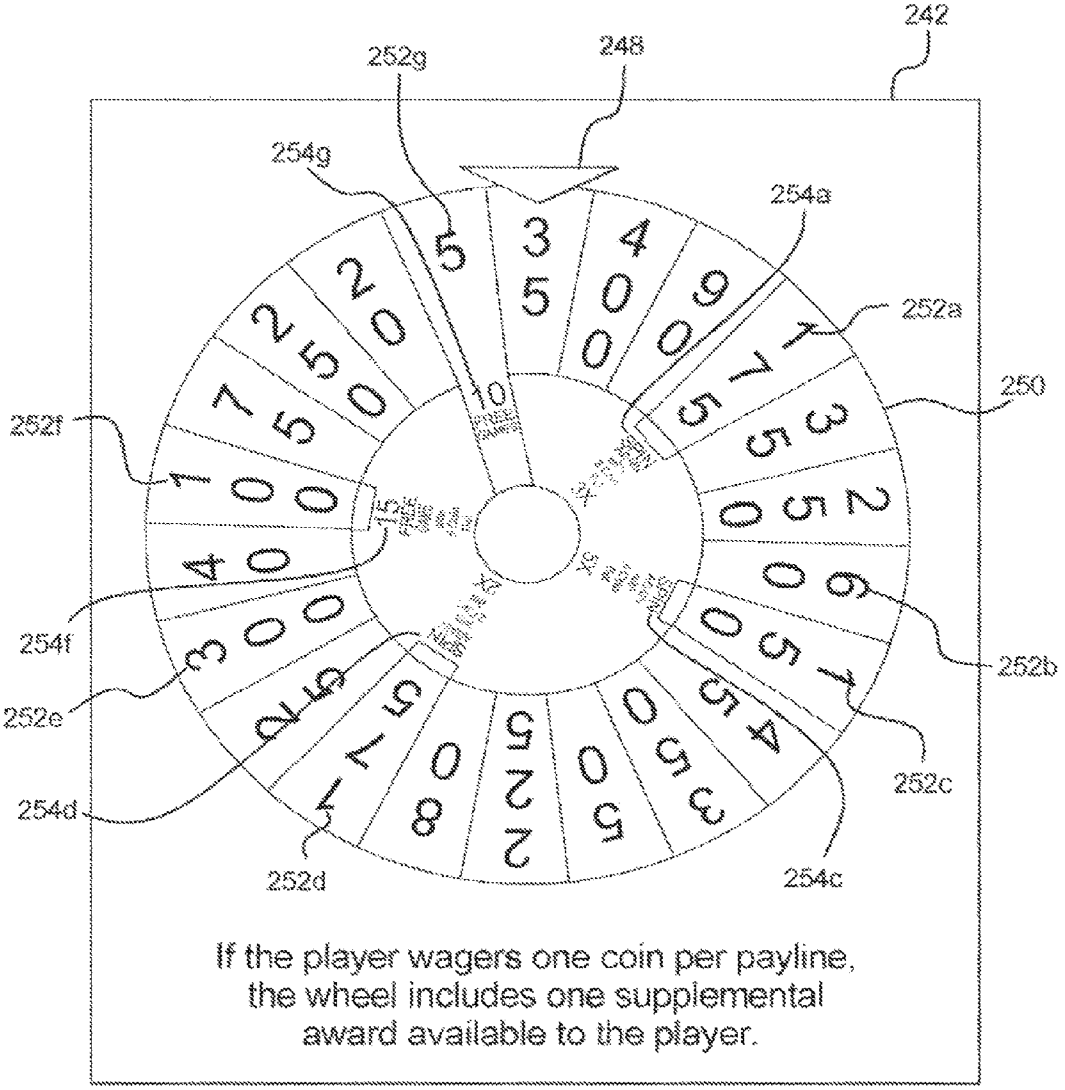
FIGS. 6A, 6B, and 6C are screen shots of one embodiment of a gaming device providing different numbers of available supplemental awards based on different triggering events.
Figure 6B:
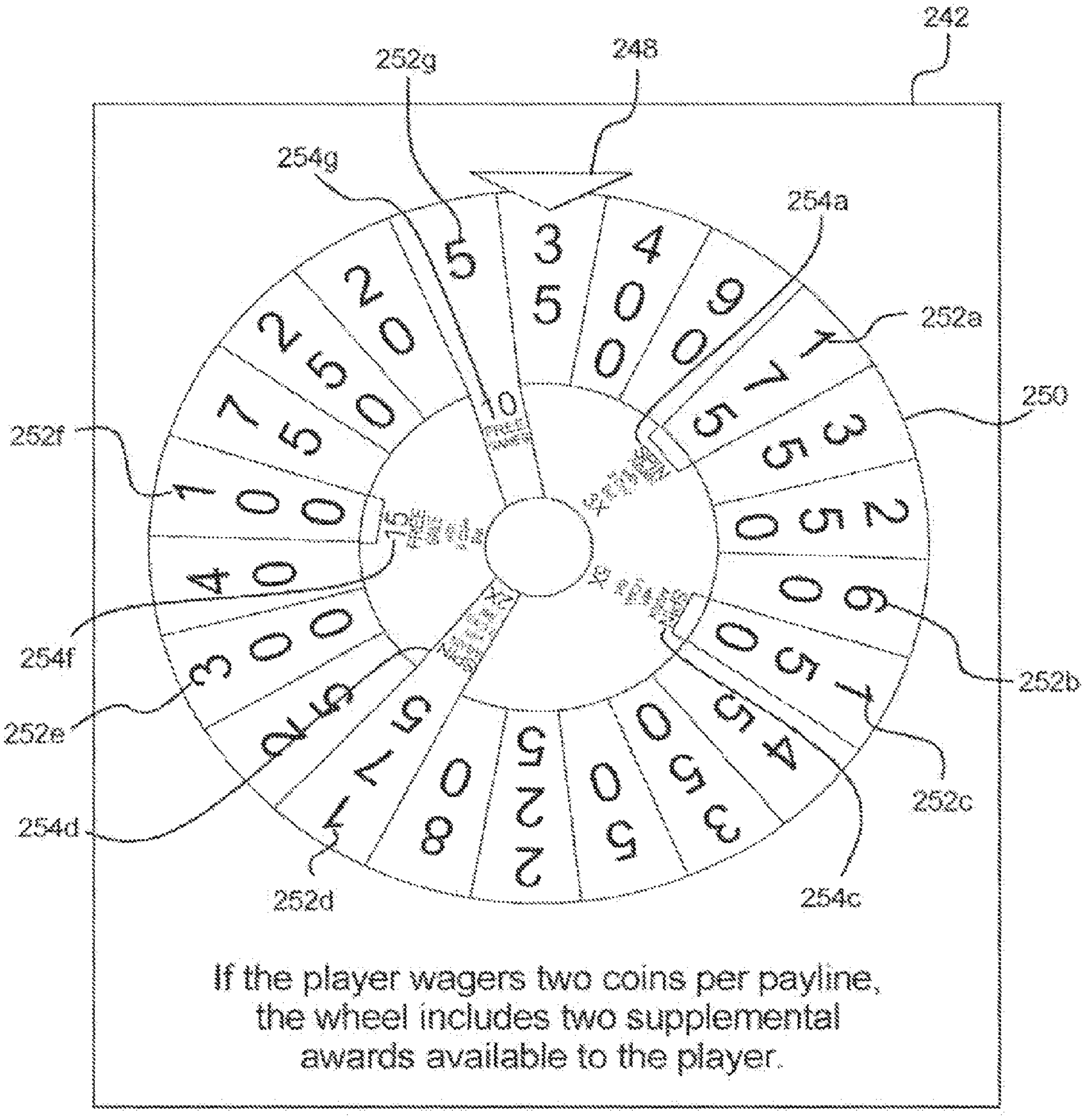
Figure 6C:
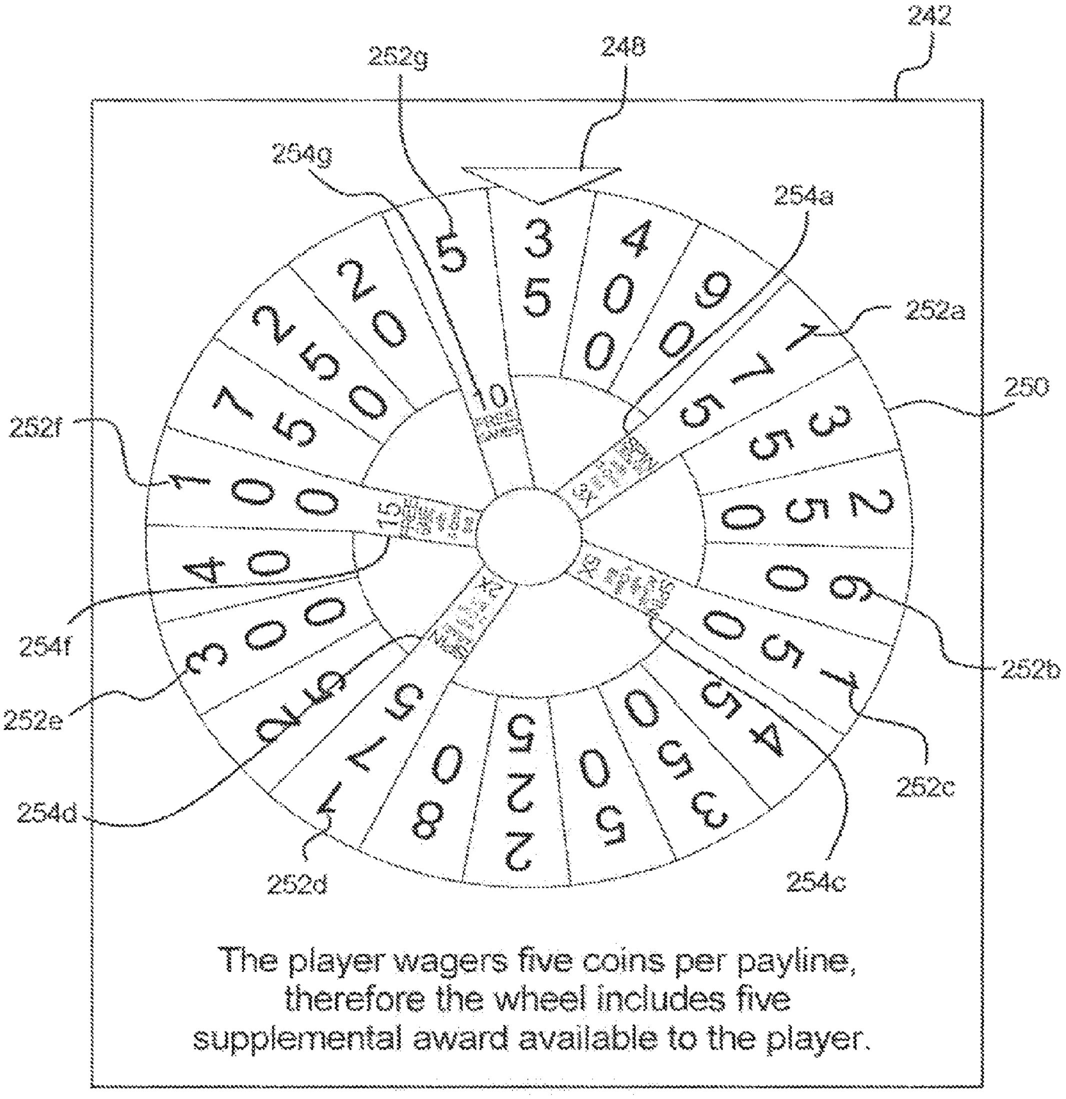

FIGS. 6A, 6B, and 6C illustrate one embodiment where the main, initial or default bonus awards 252*a*, 252*b*, 252*c*, 252*d*, 252*e*, 252*f*, and 254*g*, for example, are displayed to the player on an exterior area of a symbol generator. Supplemental awards 254*a*, 254*c*, 254*d*, 254*f*, and 254*g*, are displayed on an interior area of the symbol generator and are the supplemental awards available to be added to the bonus awards. Upon an occurrence of an award adding triggering event, the gaming device extends one or more sections to add or include one or more supplemental awards. The gaming device determines how many supplemental awards to make available to the player based on which award adding triggering events occurs.

As illustrated in FIG. 6A, the player has a chance for a supplemental award of 10 free games in a play of the bonus game because the player wagers one coin or credit per payline in the primary game.

As illustrated in FIG. 6B, the player also has a chance for a supplemental award of a free spin with a multiplier of 2 because the player wagers two coins or credits per payline in the primary game.

The player has a chance for a supplemental award of an extra spin with a multiplier of 3 if the player wagers 3 coins or credits per payline in the primary game. The player has a chance for a supplemental award of an extra spin with a multiplier of 5 if the player wagers 4 coins per payline.

As illustrated in FIG. 6C, the player has the chance to win one of five supplemental awards if the player wagers five coins or credits per payline in the primary game. Thus, the player has a chance to win the supplemental awards of ten free games, a free spin with a multiplier of 2, a free spin with a multiplier of 3, a free spin with a multiplier of 5, and 15 free games.

It should be appreciated that the supplemental awards may be added to the same or different sections of the symbol generator. For example, supplemental awards may be added in a certain order to certain sections upon the occurrence of one or more award adding triggering events.

Figure 7A:
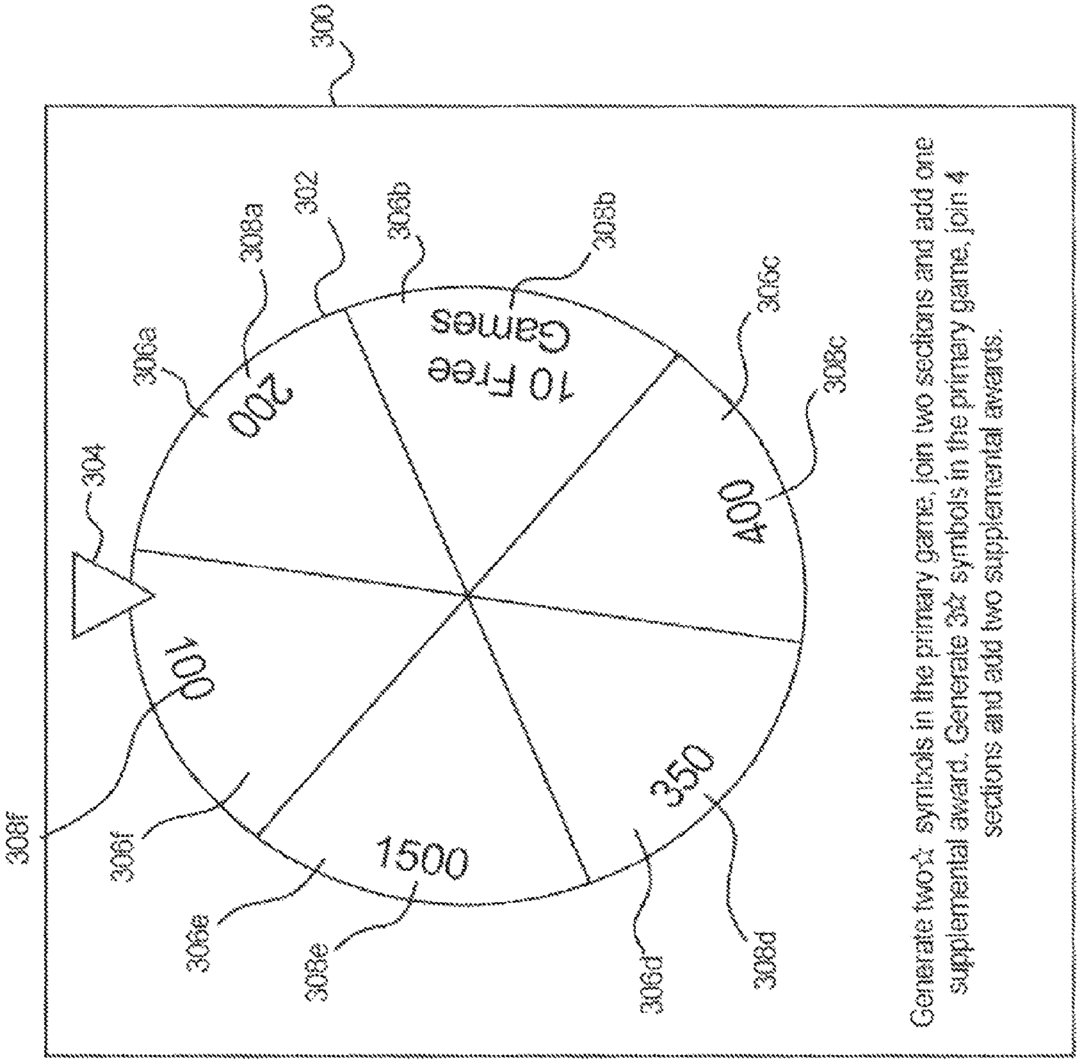
FIGS. 7A and 7B are front views of one embodiment of the displays of a gaming device joining sections and adding supplemental awards to a symbol generator based on an occurrence of a triggering event.
Figure 7B:
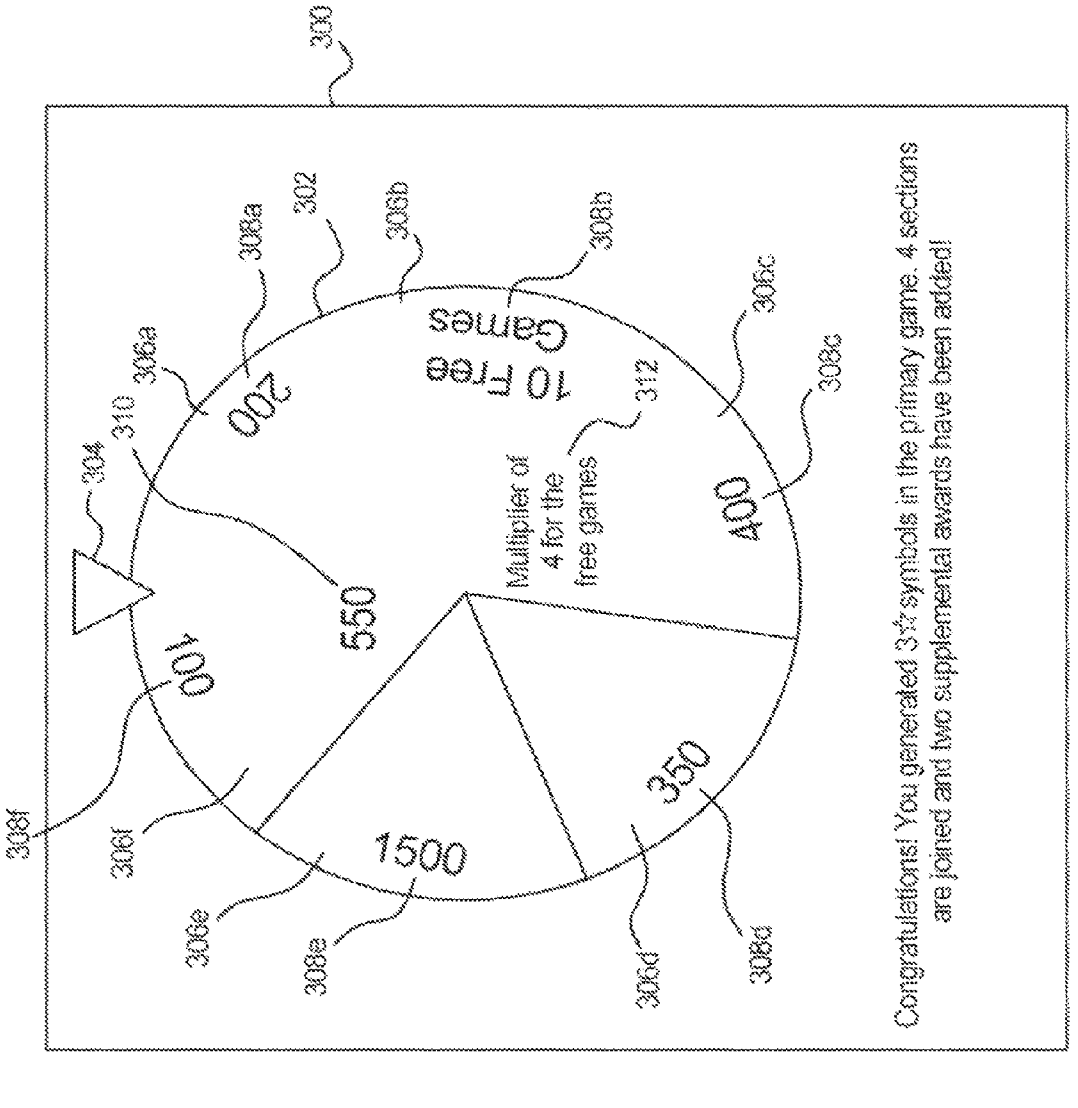

FIGS. 7A and 7B illustrate one embodiment which includes upon an occurrence of a joinder triggering event, joining two or more sections and upon an occurrence of an award adding triggering event adding one or more supplemental awards to the symbol generator. In one such embodiment, the joinder triggering event and the award adding triggering event are the same event. In another embodiment, the joinder triggering event and the award adding triggering event are different events.

As illustrated in FIG. 7A, the gaming device informs the player if two star symbols are generated in the primary game, the gaming device will join two sections and add one supplemental award to the symbol generator. If the gaming device generates three star symbols in the primary game, the gaming device will join four sections of the symbol generator and add two supplemental awards to the symbol generator.

As illustrated in FIG. 7B, the gaming device generated three star symbols in the primary game, and therefore the gaming device joins sections **306*f*, 306*a*, 306*b*, and 306*c* of the symbol generator. The gaming device also adds a supplemental award 310 of 550 credits and a supplemental award 312** of a multiplier of four for the 10 free games to the symbol generator. If the gaming device indicates the joined section after an activation of the symbol generator, the gaming device provides the player an award of 100, 200, 550, 400, and 10 free games with a multiplier of 4.

Figure 8A:
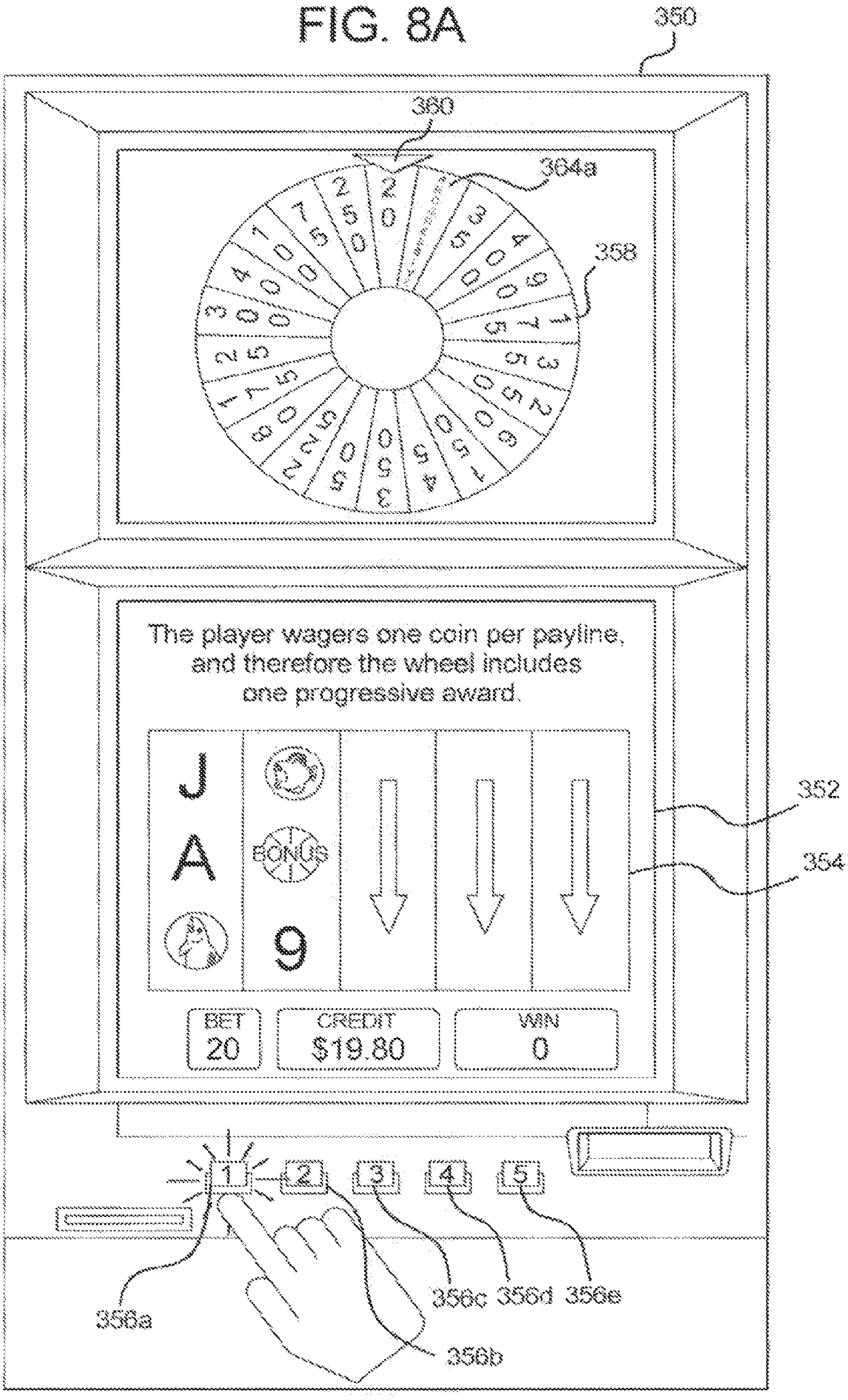
FIGS. 8A, 8B, and 8C are front views of one embodiment of a gaming device replacing the initial awards of a symbol generator with supplemental awards based on an occurrence of a triggering event.
Figure 8B:
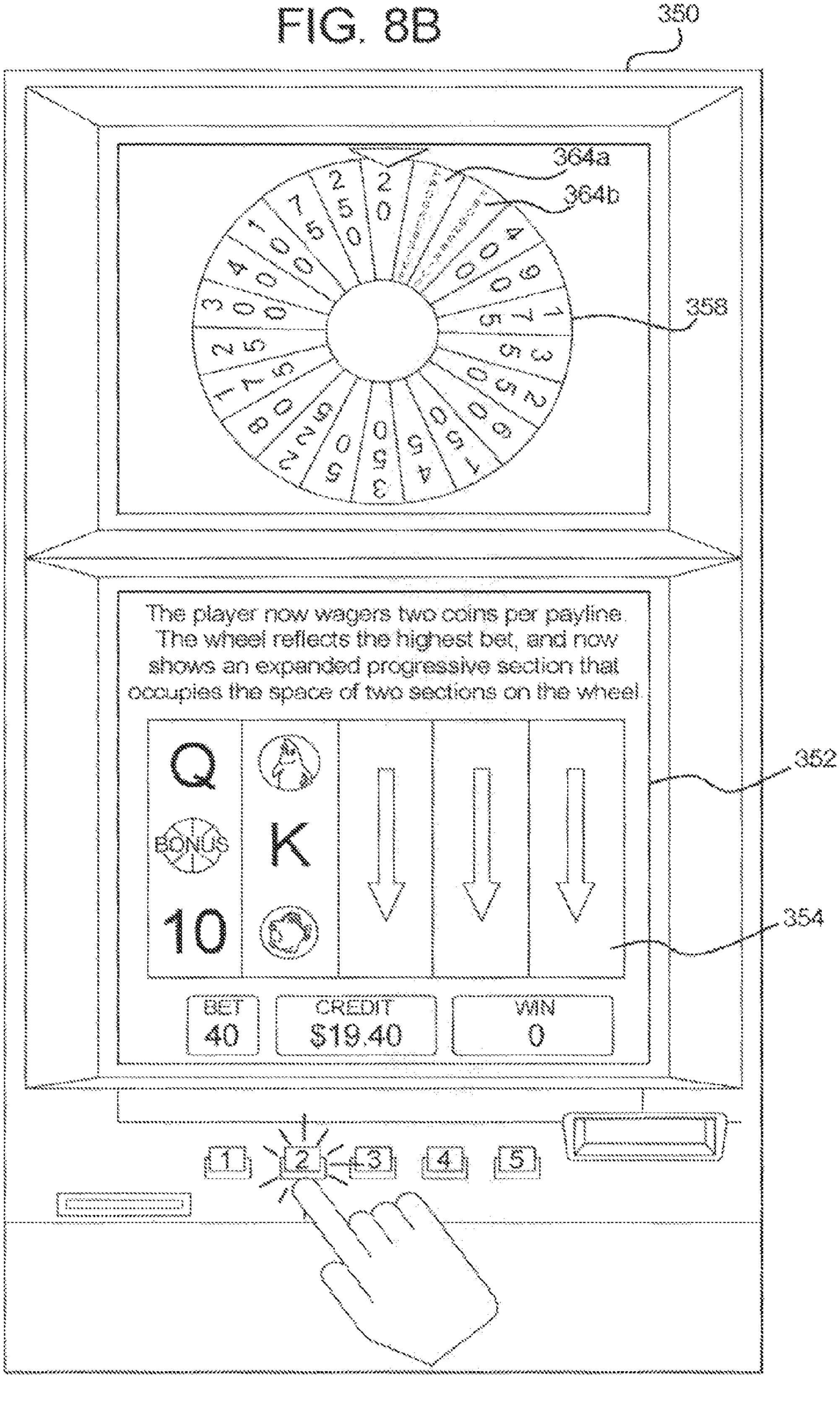
Figure 8C:
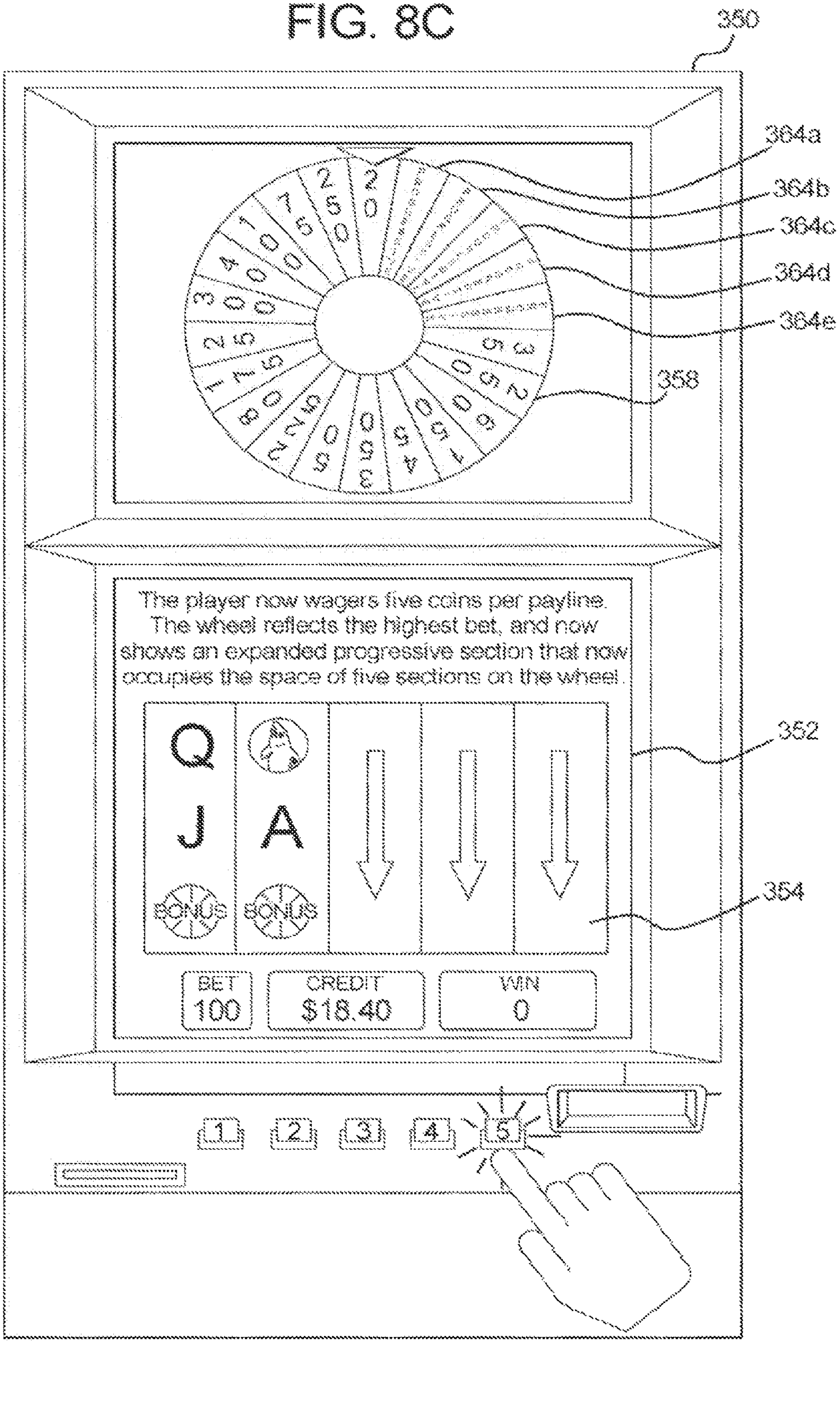

FIGS. 8A, 8B, and 8C illustrate another alternative embodiment in which supplemental awards replace one or more primary awards of a symbol generator upon an occurrence of an award adding triggering event. In one such embodiment, the number of primary awards that are replaced is based on the triggering event. For example, as illustrated in FIG. 8A, if the player wagers one coin per payline, the symbol generator 358 includes one progressive award **364*a*. As illustrated in FIG. 8B, if the player wagers two coins per payline, the symbol generator includes two progressive sections 364*a* and 364*b*. As illustrated in FIG. 80, if the player wagers five coins per payline, the symbol generator includes five progressive sections 364*a*, 364*b*, 364*c*, 364*d*, and 364*e***. In the illustrated embodiment, the supplemental awards provided are a same progressive award. However, it should be appreciated that the supplemental awards that replace primary awards may be different awards.

Additionally, in this illustrated embodiment, each of the supplemental awards replace an initial, primary or default award. For example, as illustrated in FIGS. 8A and 8B, the supplemental progressive award **364*b*** replaces a primary, initial or default award of 35 credits. However, some or all of the supplemental awards may be added to the symbol generator in addition to any primary or default awards. For example, (a) a first award adding triggering event may cause a replacement of a first primary award, and (b) a second triggering award adding event may cause a replacement of a first primary award and an additional supplemental award to be added to a section that includes a primary award while still keeping that primary award.

Figure 9:
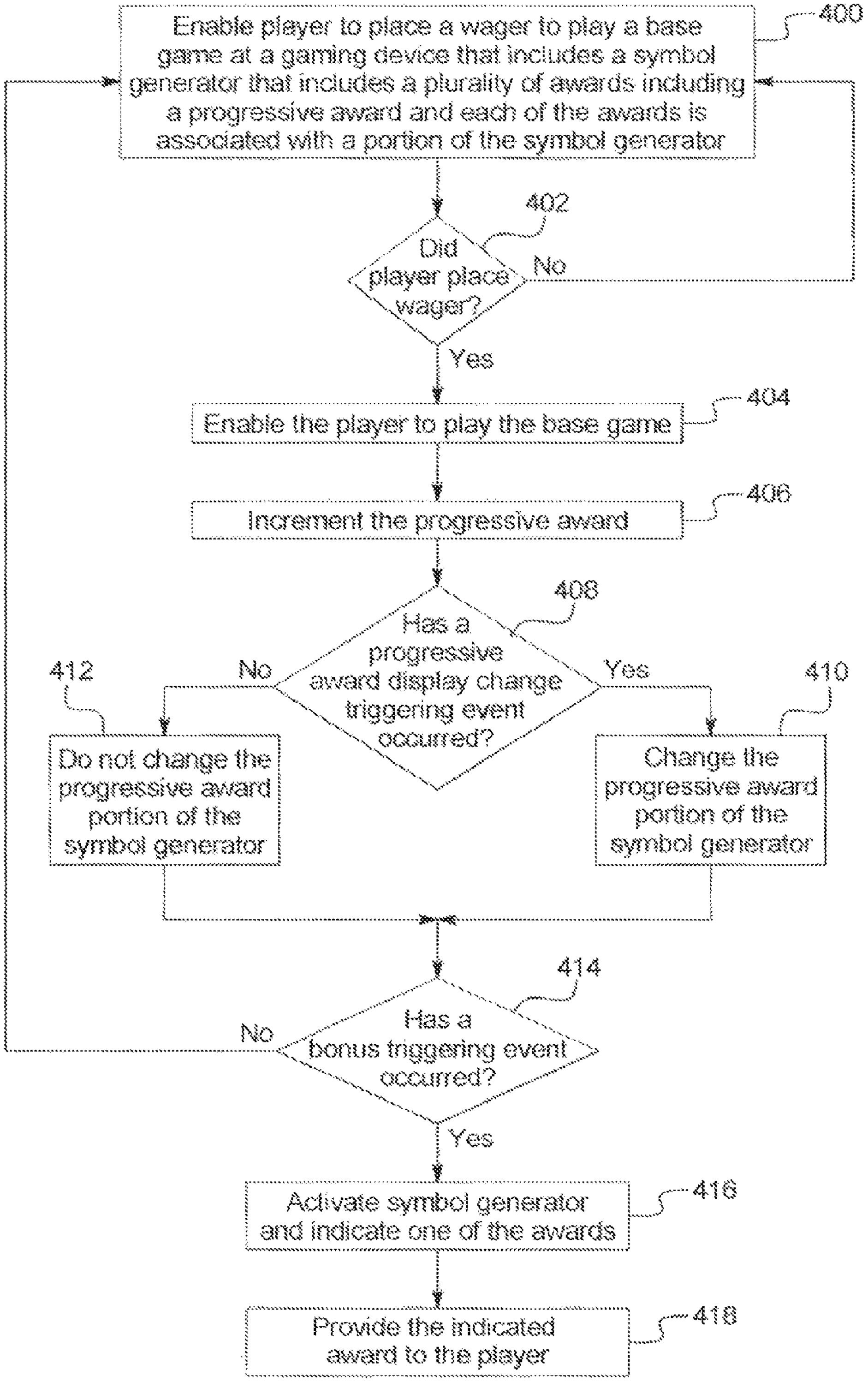
FIG. 9 is a flow chart illustrating one embodiment of a progressive award display change triggering event causing a change to the portion of the symbol generator associated with a progressive award.

As illustrated in FIG. 9, in another embodiment the gaming device dynamically changes a portion or an allocation of a progressive award on a symbol generator based on an occurrence of one or more progressive award display change triggering events. The gaming device changes the probability of indicating the progressive award based on the occurrence of one or more progressive award display change triggering events. In one embodiment, the gaming device or system enables a player to place a wager to play a base game at the gaming device. The gaming device includes a symbol generator that includes a plurality of awards or outcomes as indicated in block 400. Each of the awards is associated with a portion of the symbol generator. In one embodiment, one of the awards is a progressive award. The gaming device determines if the player placed a wager to play the base game as indicated in diamond 402. If the player did not place a wager in the base game, the gaming system continues enabling the player to place a wager. If the player placed the wager, the gaming device enables the player to play the base game as indicated in block 404. If the player did place a wager, in one embodiment, the gaming device increases the progressive award as indicated in block 406. The gaming device determines if a progressive award display change triggering event has occurred as indicated in diamond 408. If the progressive award display change triggering event has occurred, the gaming device changes the progressive award section portion or allocation on the symbol generator as indicated in block 410. More specifically, the gaming device changes the progressive award allocation by adding another progressive award section to the symbol generator, increasing the displayed size of the progressive award section or replacing one of the non-progressive awards on the symbol generator with a progressive award. If a progressive award display change triggering event does not occur, the gaming device does not change the progressive award section portion or allocation as indicated in block 412. The gaming device determines if a bonus triggering event occurs as indicated in diamond 414. If a bonus triggering event has occurred, the gaming device activates the symbol generator to indicate one of the awards as indicated in block 416. The gaming device provides the indicated award to the player as indicated in block 418. If a bonus triggering event does not occur, the gaming device enables the player to place another wager.

In one embodiment, the displayed allocation or size of an award or section on the symbol generator represents or approximately represents the probability of the gaming device generating the award or outcome upon an activation of the symbol generator. Therefore, in certain embodiments, as the size of the sections or awards increase or decrease in size on the symbol generator, the probability of indicating the sections or awards of activating those awards or sections increase or decrease in size. For example, if a section including a progressive award covers 40% of the symbol generator, the gaming device has a 40% chance of indicating the progressive award section upon an activation of the symbol generator. In other embodiments, the displayed allocation or size of an award or section on the symbol generator does not represent the probability of the gaming device generating the award or outcome upon an activation of the symbol generator. That is, each of the displayed awards or sections is associated with a probability of being generated or indicated for an activation of the symbol generator. In certain embodiments, the displayed size or allocations of the sections or the awards does not correlate to the probability of being generated. For example, if the progressive award section covers 40% of the symbol generator, the gaming device has a 5% chance of indicating the progressive award section upon an activation of the symbol generator. It should be appreciated that certain of the disclosed embodiments assume that the displayed allocation or size of an award or section on the symbol generator represents or approximately represents the probability of the gaming device generating the award or outcome upon an activation of the symbol generator for illustration purposes. However, any of the embodiments disclosed herein may be modified such that the displayed allocation or size of an award or section on the symbol generator does not represent the probability of the gaming device generating the award or outcome upon an activation of the symbol generator.

Figure 10A:
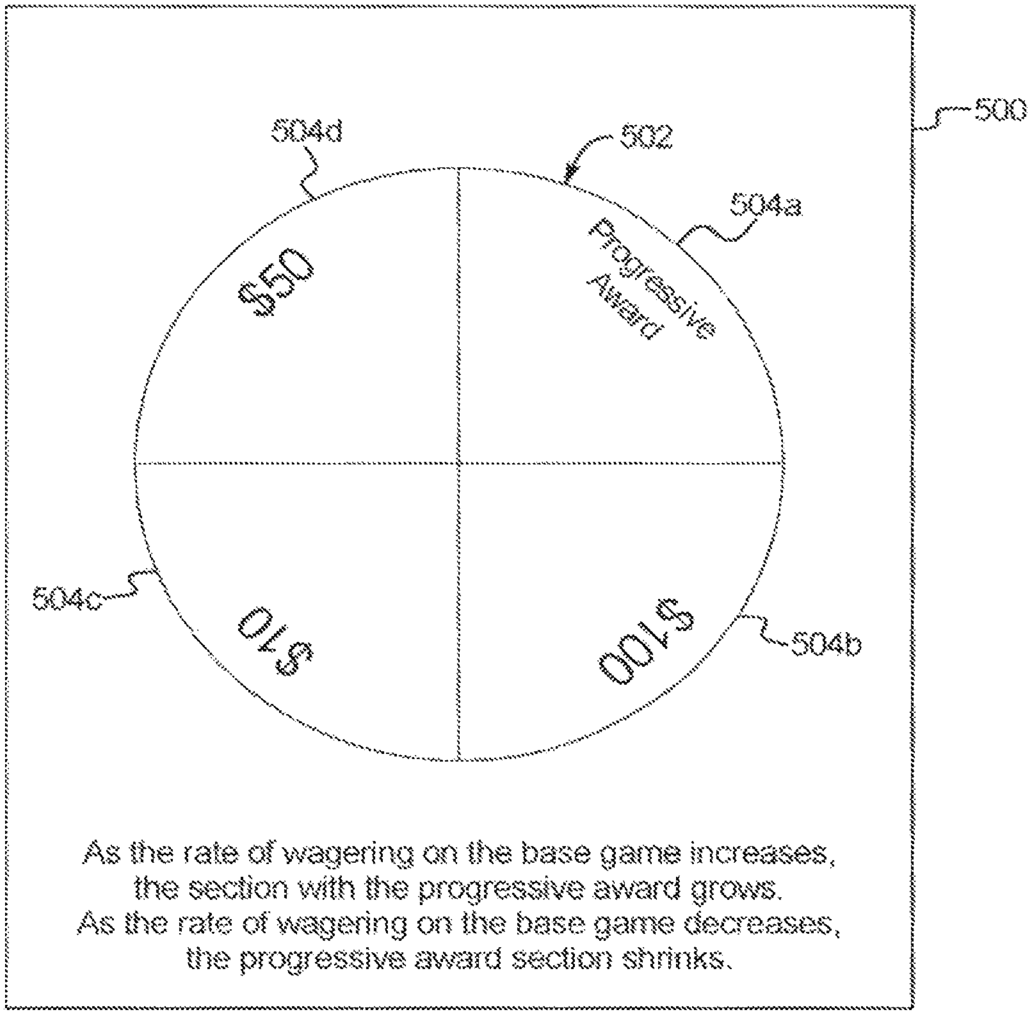
Figure 10B:
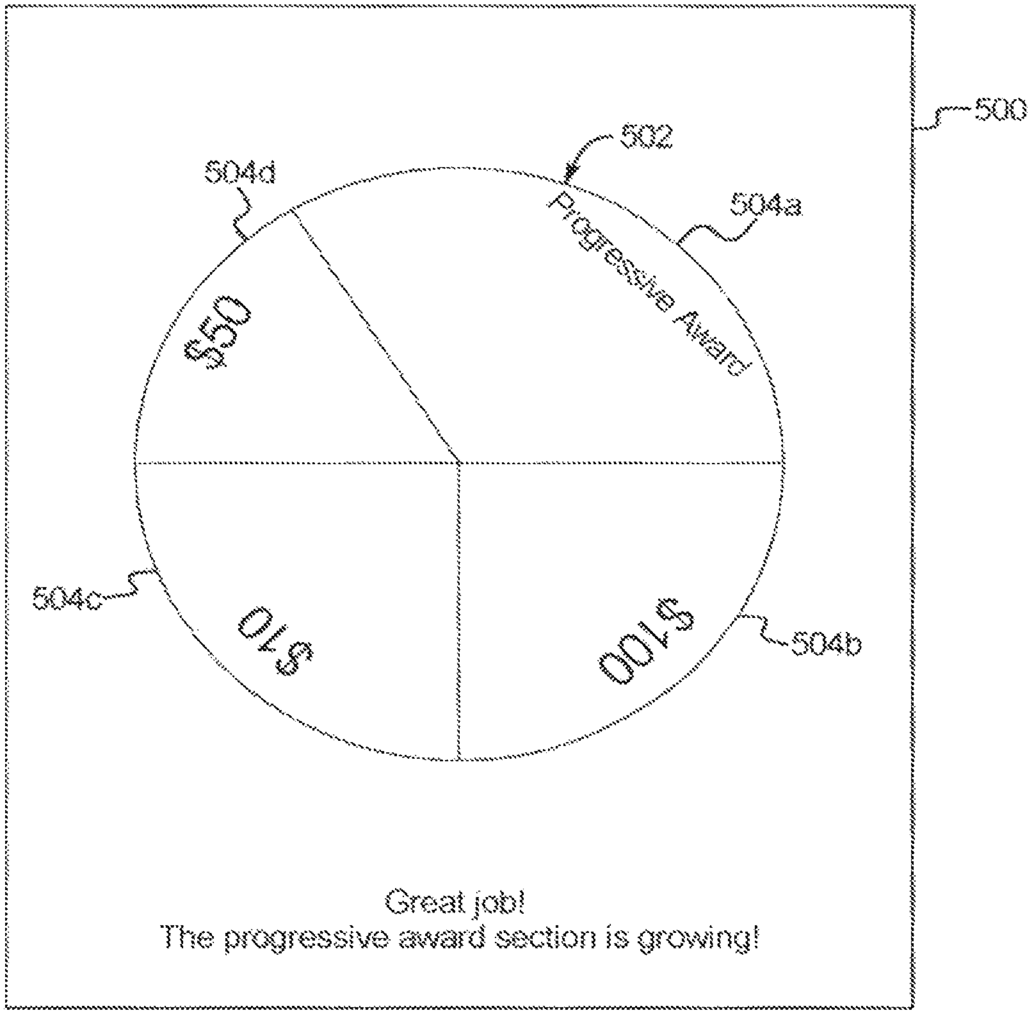
Figure 10C:

As illustrated in FIGS. 10A, 10B and 10C, in one embodiment, the progressive award display change triggering event is reaching a designated rate of wagering in the base game. That is, the displayed size of the progressive award on a symbol generator changes based on a rate of wagering in the base game and a probability of generating the progressive award changes based on the rate of wagering in the base game.

As illustrated in FIG. 10A, the symbol generator, such as a wheel, 502 includes four sections 504*a*, 504*b*, 504*c* and 504*d* that each includes an award. One of the sections 504*a* includes a progressive award. Another one of the sections 504*b* includes an award of $100. A section 504*c* includes an award of $10, and a last section 504*d* includes an award of $50.

At a first point in time, each of the sections has an initial displayed allocation on the wheel. As illustrated in FIG. 10A, each of the sections or awards is represented on 25% of the symbol generator. In this illustrated embodiment, the displayed allocation of an award or section on the symbol generator represents or corresponds to the probability of generating the award or outcome during an activation of the symbol generator. In the illustrated embodiment, for each activation of the symbol generator, the gaming device has a 25% chance of indicating each of the sections. As the rate of coin-in or wagering increases or decreases, the allocation of the progressive award or progressive section on the wheel increases or decreases, making it more likely or less likely that the gaming device will indicate the progressive award section upon an occurrence of a bonus triggering event.

As illustrated in FIG. 10B, the rate of wagering increased at the gaming device, and the gaming device increases the allocation or portion of the progressive award section on the symbol generator. In the illustrated embodiment, the size of the section that includes the progressive award increases and the size of the adjacent section associated with a non-progressive award 504*d* decreases.

As illustrated in FIG. 10C, the rate of wagering decreased at the gaming device. Therefore, in one embodiment, the portion or allocation of the section that includes or is associated with the progressive award decreases and one or more of the allocations of the non-progressive awards increases. As illustrated in FIG. 10C, one of the non-progressive award sections 604*d* adjacent to the progressive award section increases in size.

It other embodiments, the displayed allocation of an award or section on the symbol generator does not represent the probability of generating the award or outcome during an activation of the symbol generator. For example, each of the sections covers 25% of the symbol generator but the gaming device has a 75% probability of indicating one of the sections, an 8% probability of indicating another one of the sections, a 2% probability of indicating another one of the sections, and a 15% probability of indicating the other section.

Figure 11A:
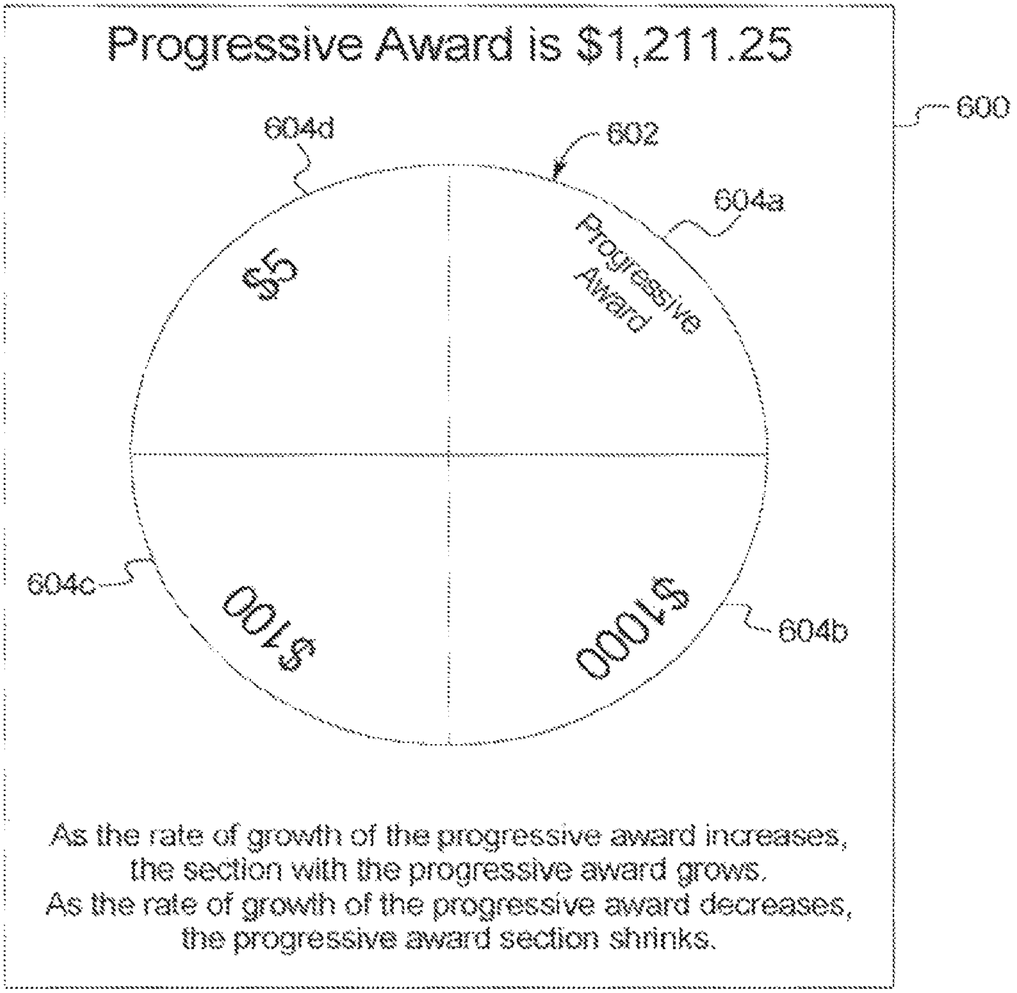
FIGS. 11A, 11B and 11C are screen shots illustrating one embodiment of the gaming device changing the size of a progressive award section based on a progressive award growth rate of the progressive award.
Figure 11B:
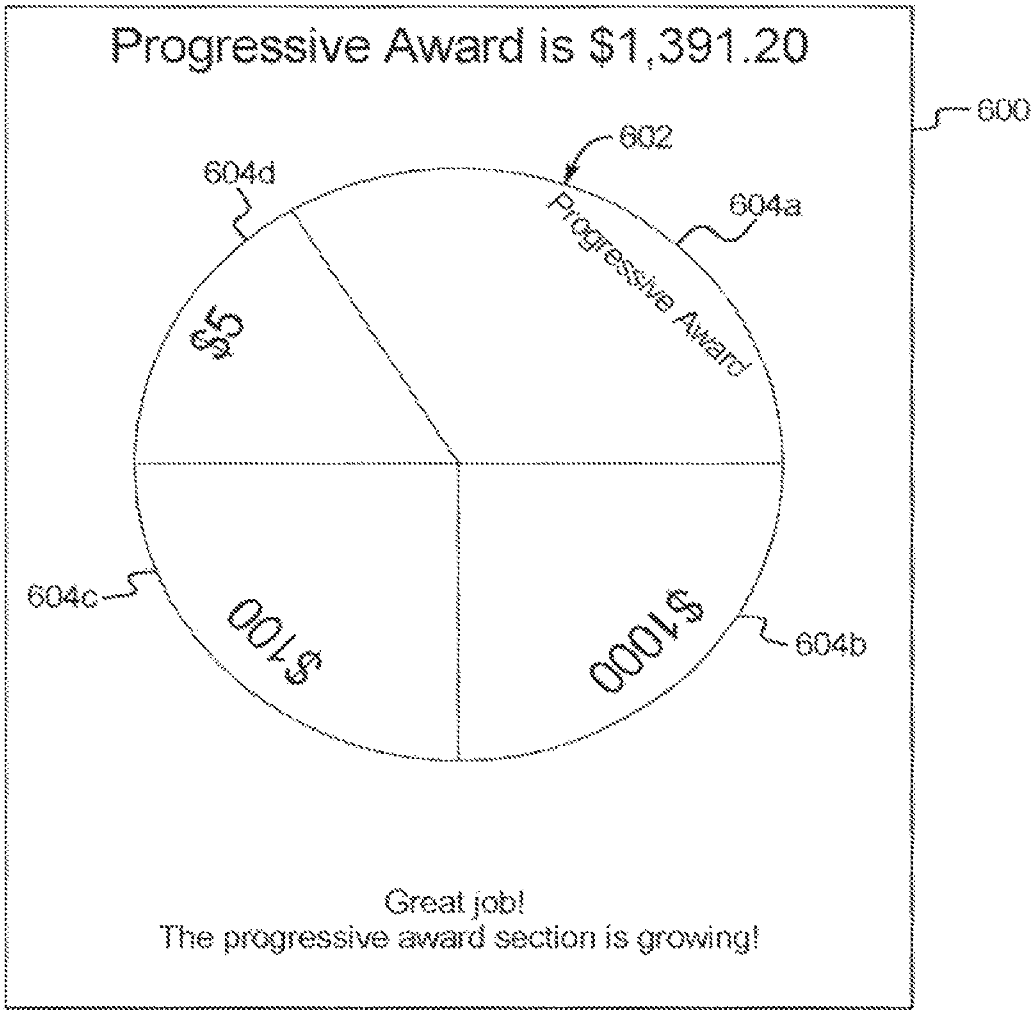
Figure 11C:
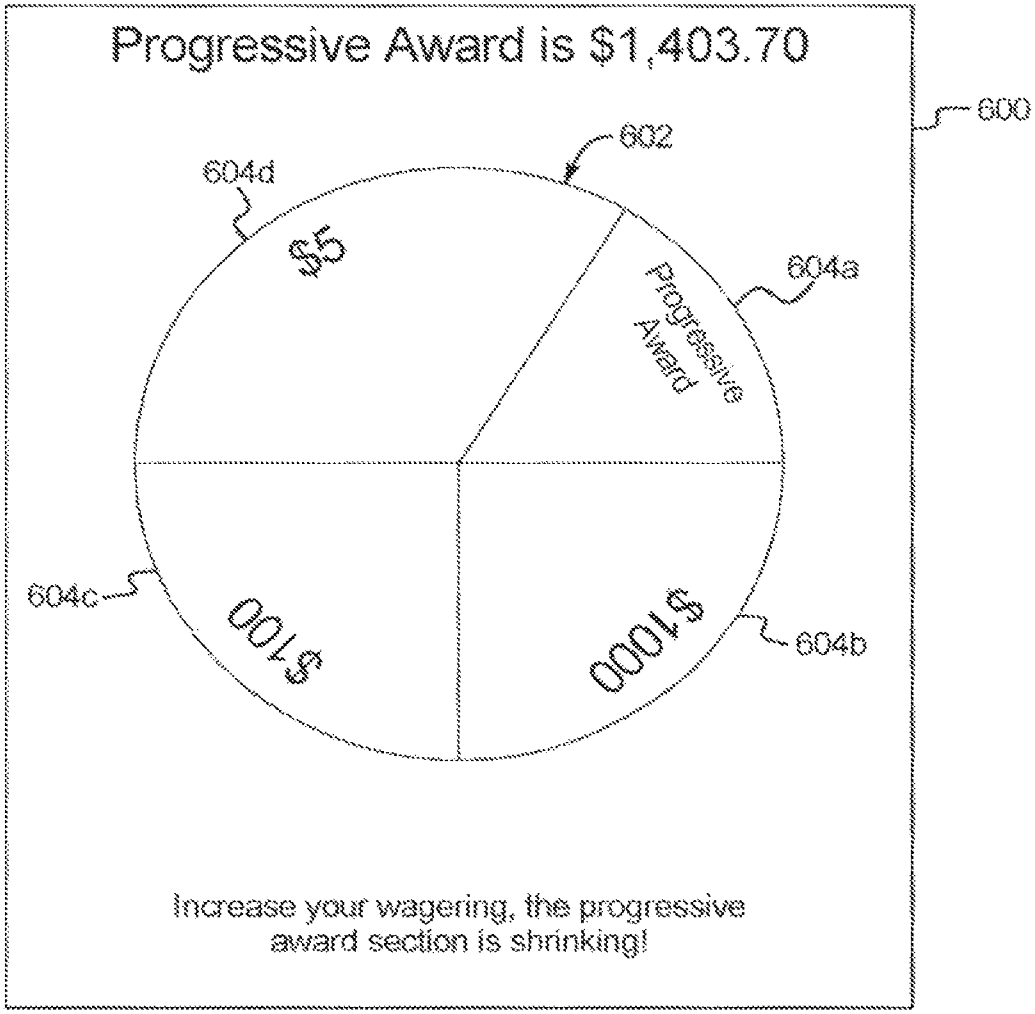

As illustrated in FIGS. 11A, 11B and 11C, in one embodiment, the progressive award display change triggering event is obtaining a designated progressive award growth rate of the progressive award. That is, the displayed size of the progressive award on a symbol generator changes based on a rate of the value of the progressive award changing. In one embodiment, the progressive award increases or grows based on a set percentage of coin-in. In other embodiment, the progressive award increases non-proportionally based on an amount wagered or upon an occurrence of another triggering event.

As illustrated in FIG. 11A, the symbol generator, such as a wheel, 602 includes four sections 604*a*, 604*b*, 604*c* and 604*d* that each include an award. One of the sections 604*a* includes a progressive award. Another one of the sections 604*b* includes an award of $1,000. A section 604*c* includes an award of $100, and a last section 604*d* includes an award of $5.

At a first point in time, each of the sections has an initial allocation on the wheel. As illustrated in FIG. 11A, each of the sections or awards is represented on 25% of the wheel. In one embodiment, the displayed percentage of an award or section on the symbol generator represents the probability of generating the award or outcome during an activation of the symbol generator. Therefore, on each activation of the symbol generator, the gaming device has a 25% chance of indicating each of the sections. As the growth rate of the progressive award increases or decreases, the allocation of the progressive award or progressive section on the wheel increases or decreases, making it more likely or less likely that the gaming device will indicate the progressive award section upon an occurrence of a bonus triggering event.

As illustrated in FIG. 11B, the progressive award growth rate of the progressive award increases, and the gaming device increases the allocation or portion of the progressive award section on the symbol generator. In the illustrated embodiment, the size of the section that includes the progressive award increases and the size of the adjacent section associated with a non-progressive award 604*d* decreases.

As illustrated in FIG. 11C, the progressive award growth rate of the progressive award decreased at the gaming device. Therefore, the portion or allocation of the section that includes or is associated with the progressive award decreases. Therefore, one or more of the allocations of the non-progressive awards increases. As illustrated in FIG. 11C, one of the non-progressive award sections 604*d* adjacent to the progressive award section increases in size.

Figure 12A:
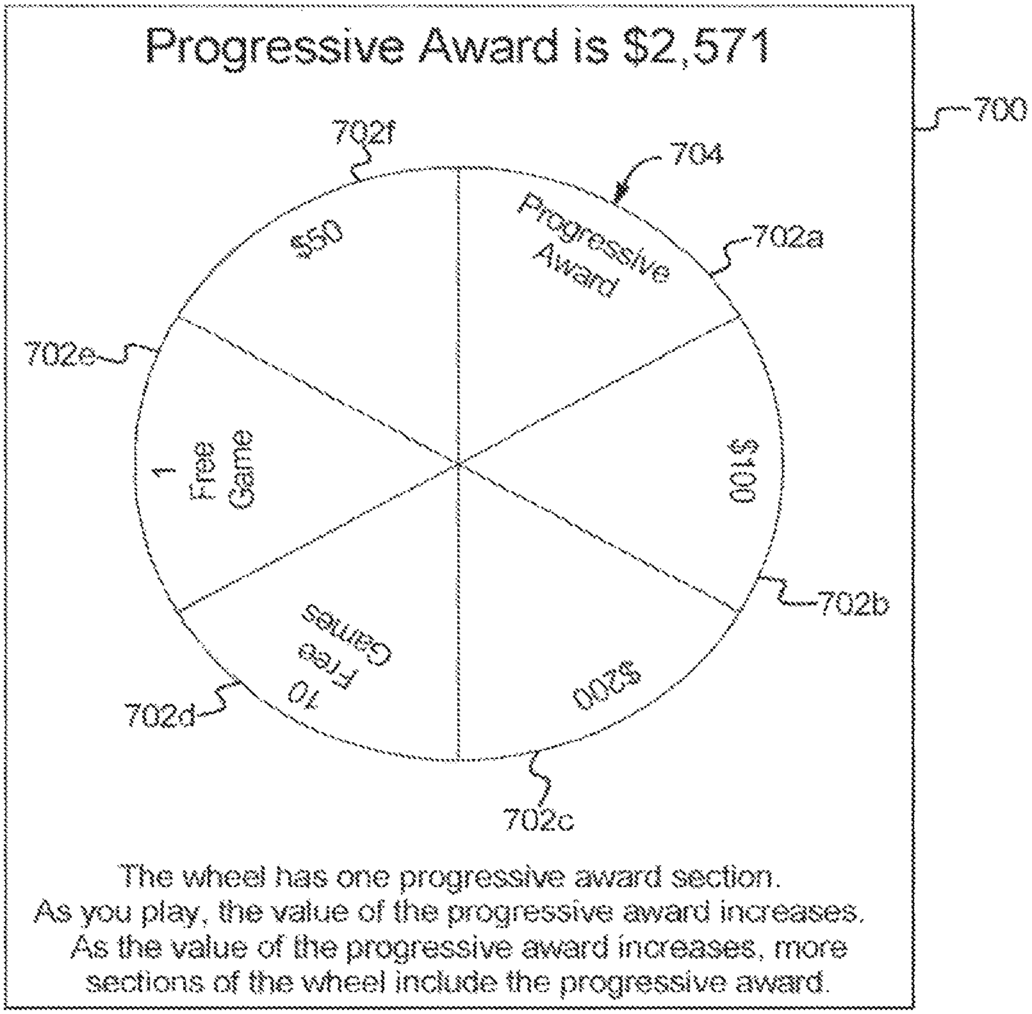
FIGS. 12A and 12B are screen shots illustrating one embodiment of the gaming device replacing a non-progressive award with a progressive award upon an occurrence of a progressive award display change triggering event.

As illustrated in FIG. 12A, in one embodiment, one of the awards or outcomes of the symbol generator 704 is a progressive award displayed in section 702*a*. In one embodiment, the gaming device increases or grows the progressive award based on coin-in at the gaming device. That is, the value of the progressive award increases based on a percentage of the total value of the wagers placed at the gaming device. The progressive award may increase proportionally to the amount wagered, such as 1% of all wagers are allocated to the progressive award. In another embodiment, the progressive award is based on a non-linear percentage of wagers. For example, 1% of wagers in the amount of $1 to $5 and 2% of wagers in the amount of $5 and over are allocated to the progressive award. When a progressive award display change triggering event occurs, such as the value of the progressive award increasing by a designated value, the gaming device increases the number progressive award of sections of the symbol generator that include or are associated with a progressive award.

Figure 12B:
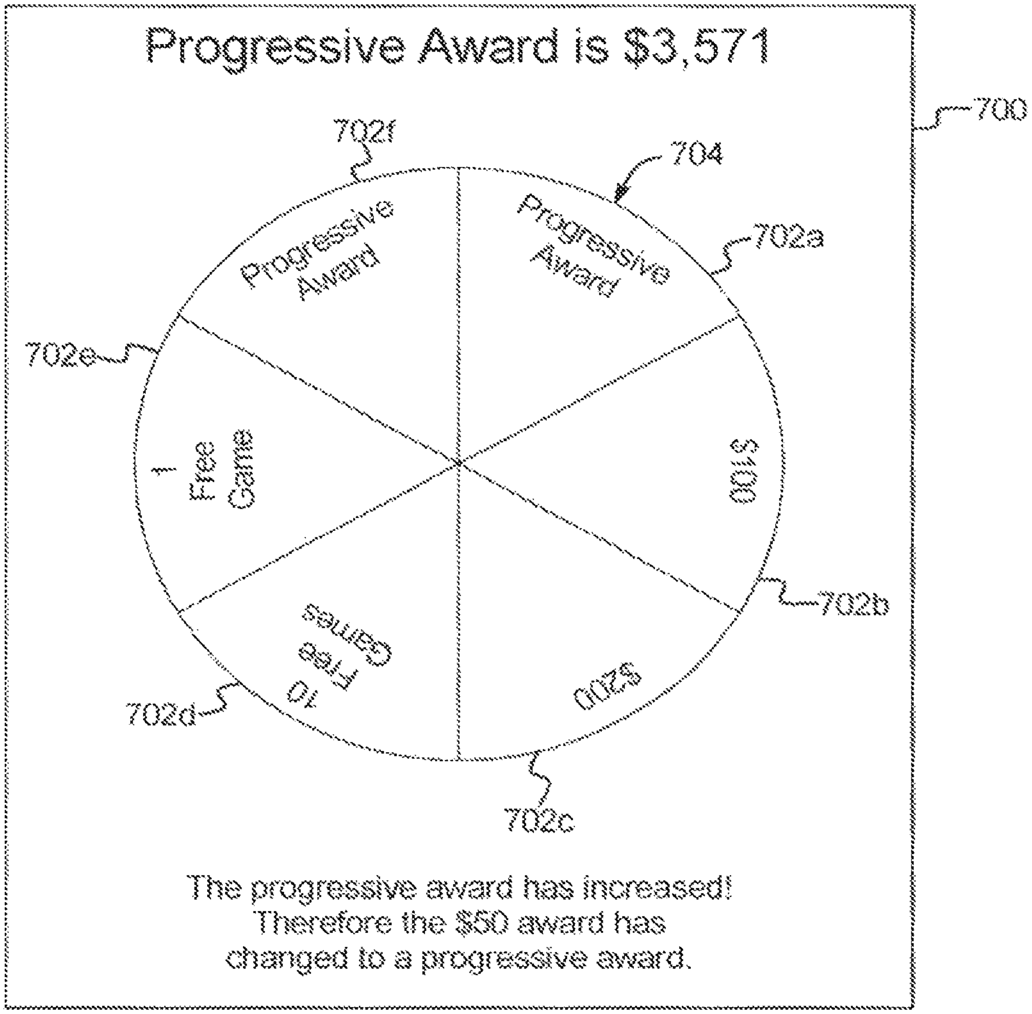

As illustrated in FIG. 12A, the progressive award is $2,571. The gaming device has one progressive award section 702*a*. As illustrated in FIG. 12B, the progressive award increases to $3571. In the illustrated embodiment, the progressive award display change triggering event is an increase in the progressive award by a designated value. In the illustrated embodiment, the progressive award display change triggering event is an increase of the progressive award of $1000. Therefore, in this embodiment, the gaming device replaces one of the awards on the symbol generator, the $50 award of section 702*f*, with a progressive award. Upon an occurrence of a bonus triggering event, the gaming device activates the symbol generator to indicate one of the sections of the symbol generator. The gaming device has a greater chance of indicating the progressive award with two sections that include progressive awards than it did of indicating a progressive award when only one of the sections included a progressive award. Therefore, in one embodiment, as the number of progressive award sections increase, the player has a greater chance of winning the progressive award in the play of the symbol generator bonus game.

In certain embodiments, as the sections or awards increase or decrease in size on the symbol generator, the probability of indicating the sections or awards of activating those awards or sections increases or decreases in size but does not represent the probability associated with of the gaming device generation the award or outcome during an activation of the symbol generator. For example, initially a section covers 30% of the symbol generator and the gaming device has a 5% chance of indicating that section upon an activation of the symbol generator. Upon an occurrence of a progressive award display change triggering event occurring, that section covers 50% of the symbol generator and the gaming device has a 7% chance of indicating that section upon an activation of the symbol generator. It should be appreciated that the probability of indicating a section may change proportionally or unproportionally with the change in the size or allocation of a section.

It should be appreciated that the progressive award display change triggering event may be any suitable event, including but not limited to a designated value or amount of coin-in, a designated increase in the value or amount of coin-in, a designated rate of coin-in, a designated increase or decrease in a value of the progressive award, a designated progressive award growth rate of the progressive award, a designated rate of play at a gaming device or a designated number of gaming devices, and a number of games played on the gaming system.

It should be appreciated that the representation of the progressive award on the symbol generator may be increased linearly or non-linearly with the size of the progressive award. In one embodiment, after the progressive award is provided to a player, the gaming device removes the progressive award from the symbol generator or reallocates the representation of the progressive award on the symbol generator. In one embodiment, the gaming device reallocates the representation of the progressive award on the symbol generator after a new player signs on to play at a gaming device.

It should be appreciated that the progressive award may be increased or may grow based on any suitable factor including but not limited to coin-in, coin out, a passage of a designated amount of time, a designated number of games played, a random determination, a generation of a designated game outcome and an accumulation of a designated game event.

It should be appreciated that the progressive award may be linked to a plurality of gaming devices.

It should be appreciated that the size of the sections or awards of the symbol generator may be changed in any suitable manner. In one embodiment, one or more progressive awards replaces one or more awards or outcomes on the symbol generator. For example, initially there are 6 non-progressive awards displayed by the symbol generator. Upon an occurrence of a first progressive award display change triggering event, the gaming device replaces each of 2 of the 6 non-progressive awards with a progressive award. There are now 2 progressive awards displayed by the symbol generator and 4 non-progressive awards displayed by the symbol generator. Upon an occurrence of a second progressive award display change triggering event, the gaming device replaces 1 of the 4 displayed non-progressive awards with a progressive award. There are now 3 progressive awards displayed by the symbol generator and 3 non-progressive awards displayed by the symbol generator. It should be appreciated that one or more progressive awards may be associated with any number of sections of a symbol generator, such as none of the sections or all of the sections.

In one embodiment, upon an occurrence of a progressive award display change triggering event, the gaming device changes an allocation of the progressive award by inserting or adding one or more progressive awards or removing one or more progressive awards from the symbol generator. For example, when a progressive award increases by $3000, the gaming device adds a progressive award or a progressive award section to a symbol generator. The gaming device decreases the displayed size of one or more of the non-progressive awards or non-progressive award sections to accommodate the displayed of the new progressive award or progressive award section of the symbol generator. It should be appreciated that the size or allocation of any non-progressive awards or sections of the symbol generator may be changed in any suitable manner.

In one embodiment, the gaming device merges the section that includes the progressive award with a non-progressive award section and removes the non-progressive award from the other section. In one embodiment, each of the awards or sections has an equal allocation on the symbol generator. Therefore, when another award or section is added, each of the other awards or sections decrease proportionally. In another embodiment, one or more of the awards or sections are decreased based on the size of the award. For example, when a progressive award section is added, the section with the highest award decreases in size and the rest of the sections remain the same size. In another example, when a progressive award section is added, the two sections with the lowest awards decrease in size and the other sections remain the same size. It should be appreciated that any of the sections or awards may be decreased or increased based on any suitable determination including but not limited to a random determination, a determination based on the size of the award or section and probabilities associated with each award or section.

In one embodiment, upon an occurrence of a progressive award display change triggering event, the gaming device changes the allocation of the progressive award of the symbol generator by changing the size of the progressive award or progressive award section and one or more non-progressive awards or sections. It should be appreciated that the non-progressive awards or sections may change in avocation based on any suitable determination including but not limited to a random determination, a determination based on the size of the award or section and probabilities associated with each award or section.

In one embodiment, upon an occurrence of a progressive award display change triggering event, the gaming device changes the probability of indicating the progressive award of the symbol generator by changing the probability of indicating the progressive award or progressive award section and the probability of indicating one or more non-progressive awards or sections. It should be appreciated that the probabilities associated with the non-progressive awards or sections may change based on any suitable determination including but not limited to a random determination and a determination based on the size of the award or section.

It should be appreciated that a symbol generator may include or be associated with multiple progressive awards and the gaming device may change the size of the display of each of the multiple progressive awards on the symbol generator in any suitable manner.

It should be appreciated that the symbol generator may initially include any suitable number of progressive awards and the size or allocation of those progressive awards may increase or decrease upon an occurrence of a progressive award display change triggering event. In one embodiment, the symbol generator does not include a progressive award until the occurrence of a progressive award display change triggering event. The allocation of that progressive award then changes based on occurrences of triggering events.

It should be appreciated that the joinder triggering event, the award adding triggering event, the bonus triggering event and any other triggering events may be any suitable triggering event including but not limited to a base game outcome, a wager amount, a number of paylines wagered on in a base game, a player's ranking, a bonus level, a number of games played, a designated number of credits wagered over a designated number of games, playing a gaming device for a designated amount of time, winning a designated number of points during game play and placing a side wager. It should also be appreciated the triggering events may be the same events or different events. In one embodiment, a first triggering event triggers a secondary game outcome and a second different triggering event causes one or more sections to join and/or a supplemental award to be added to the symbol generator.

It should also be appreciated that the number of sections joined may be based on different joinder triggering events or multiple joinder triggering events. For example, the gaming device joins the first number of sections of the symbol generator when the player wagers a designated amount. The gaming device joins a second different number of sections of the symbol generator when the player wagers the designated amount and a designated symbol is generated in the primary game. The gaming device joins a third different number of sections of the symbol generator when a player wins a designated number of points during a certain period of time. For example, for a symbol generator that includes sections A, B, C, D and E, an occurrence of a first triggering event causes sections A and B to join. An occurrence of a second triggering event causes sections B and C to join. An occurrence of a third triggering event causes sections C, D and E to join.

It should also be appreciated that the gaming device may determine how many sections or awards of the symbol generator to join in any suitable manner. In one embodiment, the gaming device randomly determines how many sections of the symbol generator to join. In another embodiment, how many sections of the symbol generator are joined is predetermined. In another embodiment, how many sections of the symbol generator are joined is based on which triggering event occurs. In another embodiment, how many sections of the symbol generator are joined is based on a selection made by the player. For example, the gaming device presents the player a plurality of masked selections and the player selects one of the masked selections that determines how many sections will be joined.

In different embodiments, the number of sections of the symbol generator to join and/or which sections of the symbol generator are joined are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

It should also be appreciated that the gaming device may determine which sections of the symbol generator to join or merge based on which joinder triggering event occurs or on a plurality of different joinder triggering events occur. For example, the gaming device joins two designated sections of the symbol generator when the player wagers a first designated amount. The gaming device can join two different designated sections of the symbol generator when the player wagers a second different designated amount. The gaming device can join three designated sections of the symbol generator when a player wins a designated number of points during game play.

It should also be appreciated that the gaming device may determine which sections or awards of the symbol generator to join in any suitable manner. In one embodiment, the gaming device randomly determines which sections of the symbol generator to join. In another embodiment, which sections of the symbol generator are joined is predetermined. In another embodiment, which sections of the symbol generator are joined is based on which triggering event occurs. In another embodiment, which sections of the symbol generator are joined is based on a selection made by the player. For example, the gaming device presents the player a plurality of masked selections and the player selects one of the masked selections that determines which sections will be joined. In another example, the awards of the symbol generator are masked and the gaming device enables the player to select sections to join and then unmasks the sections. In one embodiment, the player makes an input and the sections joined are based on that input. For example, the player selects a section and the section to the left of that section is joined. For example, the player selects an input that determines if the section to the left or right of a particular section is joined.

The gaming device may determine the probabilities that are associated with the joined sections being indicated for an activation of the symbol generator in any suitable manner. In one embodiment, a plurality of the sections or awards or each section or award of the symbol generator is associated with a pre-joinder probability of being indicated before any of the sections merge. For example, Section A has a 30% of being indicated, Section B has a 20% of being indicated, Section C has a 10% of being indicated and Section D has a 40% of being indicated on any single activation of the symbol generator. In one embodiment, when two of the sections join, the joined section is associated with a probability of being indicated that is equal to the sum of indication probabilities associated with each of the sections before the sections were joined. For example, Section A and Section B are joined and the joined section is associated with a 50% (30%+20%) probability of being indicated on any single activation of the symbol generator. In another embodiment, when two of the sections join, the joined section is associated with a probability of being indicated that is greater than the individual indication probability associated with each of the sections before the sections were joined. For example, Section A and Section B are joined and the joined section is associated with a probability of being indicated that is greater than 30%. In another embodiment, the probability of indicating a joined section is less than one or more of the individual indication probabilities associated with each of the sections before the sections were joined. For example, Section A and Section B are joined and the joined section is associated with a probability of being indicated that is less than 18%. In another embodiment, after one or more sections are joined, the gaming device determines new probabilities to associate with each of the sections and the probability of the joined section is not based any previously associated indication probabilities. For example, Section A and Section B are joined and the joined section is associated with a probability of being indicated that is 45%. Section C is associated with a 20% probability of being indicated. Section D is associated with a 35% probability of being indicated. It should be appreciated that the probability of indicating a joined section may be determined in any suitable manner.

It should be appreciated that the number of the supplemental awards added to the symbol generator and/or which supplemental awards added to the symbol generator may be based on different award adding triggering events. For example, the gaming device adds a first supplemental award when the player wagers a first designated amount. The gaming device adds a second different supplemental award to the symbol generator when the player wagers a second designated amount and a designated symbol is generated in a primary game. The gaming device adds both of the first and the second supplemental award to the symbol generator when a player wins a designated number of points during a certain period of time.

It should also be appreciated that the gaming device may determine which sections or awards of the symbol generator to associate with one or more supplemental awards in any suitable manner. In one embodiment, the gaming device randomly determines which sections or awards of the symbol generator to associate with one or more supplemental awards. In another embodiment, which sections or awards of the symbol generator are associated with one or more supplemental awards is predetermined. In another embodiment, which sections or awards of the symbol generator are associated with one or more supplemental awards is based on which triggering event occurs. In another embodiment, which sections or awards of the symbol generator are associated with one or more supplemental awards is based on a selection made by the player. For example, the player selects which section to add a supplemental award. In another example, the player makes a masked selection that determines which section to add the supplemental award to.

In different embodiments, the number of supplemental awards added to the symbol generator is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

In different embodiments, which supplemental awards are added to the symbol generator is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

In different embodiments, which awards or sections the supplemental awards are associated with is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

It should be appreciated that depending on the type of triggering event, the change to the symbol generator may last for a single play of the primary game or multiple plays of the primary game. For example, upon an occurrence of a joinder triggering event, the gaming device may join one or more sections for a single play of the primary game or multiple plays of the primary game. Likewise, the supplemental awards may be added to the symbol generator for a single play of the primary game or multiple plays of the primary game depending on the of type of the award adding triggering event. In the embodiment that includes adding supplemental awards and joining sections, it should be appreciated that the changes to the symbol generator may also last for different lengths of time. For example, upon an occurrence of a same joinder triggering event and award adding triggering event, the gaming device may merge designated sections for multiple plays of the primary game and only add the supplemental award for the next play of the primary game. In another example, upon an occurrence of a different joinder triggering event and different award adding triggering event, the gaming device may merge designated sections for multiple plays of the primary game and add the supplemental award for a different number of plays of the primary game. It should be appreciated that the changes made to the symbol generator upon the occurrence of a progressive award display change triggering event may last for a single play of the primary game or multiple plays of the primary game. In one embodiment, when the progressive award is paid out to a player, the progressive award is no longer displayed on the symbol generator or decreases in size on the symbol generator. The changes to the symbol generator may last for any suitable length or time or number of plays of the primary game.

It should be appreciated that in one embodiment, if a joinder triggering event is the player wagering a designated amount in the base game, the gaming device joins a plurality of sections upon that designated amount being wagered. In one such embodiment, the gaming device does not change the symbol generator back to its original number of sections until a play of the primary game where the player does not wager that designated amount. In another example embodiment, the gaming device changes the symbol generator back to a designated number of sections after each play of the primary game.

It should be appreciated that in other various example embodiments where the joinder triggering event is based on the player's rank, the gaming device changes the boundaries of increment the sections of the symbol generator upon the player logging onto (e.g., submitting the player tracking card) to the gaming device and does not reset the boundaries of the sections of the symbol generator until the player logs off the gaming device, cashes out, runs out of credits, and/or until a new player logs onto the gaming device without the required ranking. It should also be appreciated that different joinder triggering events (or different conditions for the joinder triggering event) can cause different sections or different numbers of sections to be joined.

It should be appreciated that in various embodiments, the gaming device does not change the symbol generator back to its original number of awards until a designated event. In another embodiment, the gaming device changes the symbol generator back to the original number of awards after each play of the primary game. However, if the award triggering event is the player playing at the gaming device for a designated amount of time, the supplemental award may be included on the symbol generator for multiple plays of the primary game.

In different embodiments, the length of time or the number of games or the change to the symbol generator lasts is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

It should be appreciated that the awards, outcomes, primary awards and supplemental awards of the symbol generator may be any suitable awards or outcomes including but not limited to numbers of credits, numbers of points, numbers of free spins, modifiers, multipliers, a physical prize, an entry into a tournament or a progressive award. The primary and supplemental awards may be different types of awards or the same type of awards. For example, the primary awards may be numbers of credits and the supplemental awards may be multipliers. In another example, the primary awards may be numbers of credits and the supplemental awards numbers of entries into a lottery.

It should be appreciated that the gaming device may display the merged sections in any suitable manner. In one embodiment, the symbol generator is a video symbol generator and the gaming device displays the symbol generator with less sections but the same number of awards, wherein at least one section has multiple awards. In another embodiment, the symbol generator is a mechanical symbol generator and the gaming device changes the delineation of the sections.

It should be appreciated that the gaming device may display the additional awards in any suitable manner. In one embodiment, the symbol generator is a video symbol generator and the gaming device displays the symbol generator with less sections but the same number of awards, wherein at least one section has multiple awards. In another embodiment, the symbol generator is a mechanical symbol generator and the gaming device changes the delineation of the sections.

It should be appreciated that in one embodiment, the gaming system includes an electromechanical shared symbol generator or display that is positioned adjacent to each of a plurality of associated gaming devices, such as the symbol generator described in U.S. Published Patent Application No. 2006/0046821, entitled "GAMING SYSTEM HAVING MULTIPLE GAMING DEVICES THAT SHARE A MULTI-OUTCOME DISPLAY."

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
at least one input device;
at least one display device;
at least one processor; and
at least one memory device storing a plurality of instructions which, when executed by the at least one processor, cause the at least one processor to operate with the at least one display device and the at least one input device to:
(a) display a non-progressive award associated with a secondary game, the non-progressive award having a non-zero value;
(b) display a play of a base game;
(c) upon an occurrence of a designated award display changing triggering event:
(i) remove the display of the non-progressive award, and
(ii) display a progressive award in place of the non-progressive award, said progressive award being associated with the secondary game; and
(d) upon an occurrence of a secondary game triggering event, display a play of the secondary game and display any awards associated with said play of the secondary game, wherein:
(i) if the non-progressive award is displayed, the non-progressive award is winnable in said play of the secondary game; and
(ii) if the progressive award is displayed, the progressive award is winnable in said play of the secondary game.

2. The gaming system of claim 1, wherein the at least one display device includes a symbol generator, the display of the non-progressive award is on the symbol generator, and the display of the progressive award is on the symbol generator in place of the non-progressive award.

3. The gaming system of claim 2, wherein the symbol generator includes a wheel.

4. The gaming system of claim 1, wherein the designated award display changing triggering event can occur during said play of the base game.

5. The gaming system of claim 1, wherein the base game is a wagering game.

6. The gaming system of claim 5, wherein the designated award display changing triggering event is selected from the group consisting of: a designated amount wagered, a designated rate of wagers over time, and a designated number of base game played.

7. The gaming system of claim 6, wherein the designated award display changing triggering event can occur during said play of the base game.

8. The gaming system of claim 1, wherein the secondary game triggering event can occur during said play of the base game.

9. The gaming system of claim 1, wherein the secondary game triggering event has a same probability of occurring regardless of whether the non-progressive award is displayed or the progressive award is displayed.

10. A gaming system comprising:
at least one input device;
at least one display device;
at least one processor; and
at least one memory device storing a plurality of instructions which, when executed by the at least one processor, cause the at least one processor to operate with the at least one display device and the at least one input device to:

(a) display a non-progressive award associated with a secondary game, the non-progressive award having a nonzero value;

(b) display a play of a base game;

(c) upon an occurrence of a designated award display changing triggering event:

(i) remove the display of the non-progressive award, and (ii) display a progressive award in place of the non-progressive award, said progressive award being associated with the secondary game; and (d) upon an occurrence of a secondary game triggering event:

(i) if the non-progressive award is displayed, determine whether or not to provide the non-progressive award for a play of the secondary game; and (ii) if the progressive award is displayed, determine whether or not to provide the progressive award for said play of the secondary game.

11. The gaming system of claim 10, wherein the at least one display device includes a symbol generator, the display of the non-progressive award is on the symbol generator, and the display of the progressive award is on the symbol generator in place of the non-progressive award.

12. The gaming system of claim 11, wherein the symbol generator includes a wheel.

13. The gaming system of claim 10, wherein the designated award display changing triggering event can occur during said play of the base game.

14. The gaming system of claim 10, wherein the base game is a wagering game.

15. The gaming system of claim 14, wherein the designated award display changing triggering event is selected from the group consisting of: a designated amount wagered, a designated rate of wagers over time, and a designated number of base games played.

16. The gaming system of claim 15, wherein the designated award display changing triggering event can occur during said play of the base game.

17. The gaming system of claim 10, wherein the secondary game triggering event can occur during said play of the base game.

18. The gaming system of claim 10, wherein the secondary game triggering event has a same probability of occurring regardless of whether the non-progressive award is displayed or the progressive award is displayed.

19. The gaming system of claim 10, wherein the determination of whether or not to provide the non-progressive award and the determination of whether or not to provide the progressive award is a same determination.

20. A method of operating a gaming system, said method comprising:

(a) causing at least one processor to execute a plurality of instructions stored in at least one memory device to operate with at least one display device to display a non-progressive award associated with a secondary game, the non-progressive award having a nonzero value;

(b) causing the at least one processor to execute the plurality of instructions to operate with the at least one display device to display a play of a base game;

(c) upon an occurrence of a designated award display changing triggering event, causing the at least one processor to execute the plurality of instructions to operate with the at least one display device to:

(i) remove the display of the non-progressive award, and (ii) display a progressive award in place of the non-progressive award, said progressive award being associated with the secondary game; and (d) upon an occurrence of a secondary game triggering event, causing the at least one processor to execute the plurality of instructions to operate with the at least one display device to display a play of the secondary game and display any awards associated with said play of the secondary game, wherein:

(i) if the non-progressive award is displayed, the non-progressive award is winnable in said play of the secondary game; and (ii) if the progressive award is displayed, the progressive award is winnable in said play of the secondary game.

21. The method of claim 20, wherein the at least one display device includes a symbol generator, the display of the non-progressive award is on the symbol generator, and the display of the progressive award is on the symbol generator in place of the non-progressive award.

22. The method of claim 21, wherein the symbol generator includes a wheel.

23. The method of claim 20, wherein the designated award display changing triggering event can occur during said play of the base game.

24. The method of claim 20, wherein the base game is a wagering game.

25. The method of claim 24, wherein the designated award display changing triggering event is selected from the group consisting of: a designated amount wagered, a designated rate of wagers over time, and a designated number of base games played.

26. The method of claim 25, wherein the designated award display changing triggering event can occur during said play of the base game.

27. The method of claim 20, wherein the secondary game triggering event can occur during said play of the base game.

28. The method of claim 20, wherein the secondary game triggering event has a same probability of occurring regardless of whether the non-progressive award is displayed or the progressive award is displayed.

29. The method of claim 20, which is provided through a data network.

30. The method of claim 29, wherein the data network is an internet.

31. A method of operating a gaming system, said method comprising:

(a) causing at least one processor to execute a plurality of instructions stored in at least one memory device to operate with at least one display device to display a non-progressive award associated with a secondary game, the non-progressive award having a nonzero value;

(b) causing the at least one processor to execute the plurality of instructions to operate with the at least one display device to display a play of a base game;

(c) upon an occurrence of a designated award display changing triggering event, causing the at least one processor to execute the plurality of instructions to operate with the at least one display device to:

(i) remove the display of the non-progressive award, and (ii) display a progressive award in place of the non-progressive award, said progressive award being associated with the secondary game; and (d) upon an occurrence of a secondary game triggering event, causing the at least one processor to execute the plurality of instructions to:

(i) if the non-progressive award is displayed, determine whether or not to provide the non-progressive award for a play of the secondary game; and (ii) if the progressive award is displayed, determine whether or not to provide the progressive award for said play of the secondary game.

32. The method of claim 31, wherein the at least one display device includes a symbol generator, the display of the non-progressive award is on the symbol generator, and the display of the progressive award is on the symbol generator in place of the non-progressive award.

33. The method of claim 32, wherein the symbol generator includes a wheel.

34. The method of claim 31, wherein the designated award display changing triggering event can occur during said play of the base game.

35. The method of claim 31, wherein the base game is a wagering game.

36. The method of claim 35, wherein the designated award display changing triggering event is selected from the group consisting of: a designated amount wagered, a designated rate of wagers over time, and a designated number of base games played.

37. The method of claim 36, wherein the designated award display changing triggering event can occur during said play of the base game.

38. The method of claim 31, wherein the secondary game triggering event can occur during said play of the base game.

39. The method of claim 31, wherein the secondary game triggering event has a same probability of occurring regardless of whether the non-progressive award is displayed or the progressive award is displayed.

40. The method of claim 31, wherein the determination of whether or not to provide the non-progressive award and the determination of whether or not to provide the progressive award is a same determination.

41. The method of claim 31, which is provided through a data network.

42. The method of claim 41, wherein the data network is an internet.

* * * * *

UNITED STATES PATENT AND TRADEMARK OFFICE

CERTIFICATE OF CORRECTION

PATENT NO. : 9,033,792 B2
APPLICATION NO. : 13/711263
DATED : May 19, 2015
INVENTOR(S) : Paulina Rodgers et al.

It is certified that error appears in the above-identified patent and that said Letters Patent is hereby corrected as shown below:

IN THE CLAIMS

In Claim 6, Column 36, Line 48, replace "game" with --games--.

Signed and Sealed this
Eighth Day of March, 2016

Michelle K. Lee
*Director of the United States Patent and Trademark Office*